US012077171B2

United States Patent
Miyagawa

(10) Patent No.: US 12,077,171 B2
(45) Date of Patent: Sep. 3, 2024

(54) VEHICLE CONTROL DEVICE, AUTOMATED DRIVING VEHICLE DEVELOPMENT SYSTEM, VEHICLE CONTROL METHOD, AND STORAGE MEDIUM FOR VERIFYING CONTROL LOGIC

(71) Applicant: HONDA MOTOR CO., LTD., Tokyo (JP)

(72) Inventor: Keisuke Miyagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 523 days.

(21) Appl. No.: 17/272,992

(22) PCT Filed: Sep. 6, 2018

(86) PCT No.: PCT/JP2018/033025
§ 371 (c)(1),
(2) Date: Mar. 3, 2021

(87) PCT Pub. No.: WO2020/049685
PCT Pub. Date: Mar. 12, 2020

(65) Prior Publication Data
US 2021/0323565 A1    Oct. 21, 2021

(51) Int. Cl.
*G08G 1/09* (2006.01)
*B60W 10/20* (2006.01)
(Continued)

(52) U.S. Cl.
CPC ............ *B60W 50/06* (2013.01); *B60W 10/20* (2013.01); *B60W 30/143* (2013.01);
(Continued)

(58) Field of Classification Search
CPC .... B60W 50/06; B60W 60/001; B60W 10/20; B60W 30/143
See application file for complete search history.

(56) References Cited

U.S. PATENT DOCUMENTS 10,679,390 B1 *  6/2020  Solgi .................. G06N 7/01
2018/0105186 A1  4/2018  Motomura et al.
(Continued)

FOREIGN PATENT DOCUMENTS

CN   107444401   12/2017
JP   2003-049702   2/2003
(Continued)

OTHER PUBLICATIONS

International Search Report and Written Opinion for International Application No. PCT/JP2018/033025 mailed on Oct. 23, 2018, 9 pages.
(Continued)

*Primary Examiner* — Jess Whittington
*Assistant Examiner* — Rami Nabih Bedewi
(74) *Attorney, Agent, or Firm* — Amin, Turocy & Watson, LLP

(57) ABSTRACT

A vehicle control device includes a first detector configured to detect a behavior of a vehicle, a second detector configured to detect a peripheral situation of the vehicle, a storage configured to store a control logic that outputs information indicating a behavior of the vehicle when at least information indicating a peripheral situation of the vehicle is input to the control logic, a deriver configured to execute the control logic to derive a behavior of the vehicle based on at least the peripheral situation of the vehicle detected by the second detector, and a determinator configured to compare a first behavior of the vehicle detected by the first detector at a certain reference time with a second behavior of the vehicle derived by the deriver based on the peripheral situation detected by the second detector at the reference time to determine whether or not the control logic is accurately operated.

15 Claims, 8 Drawing Sheets

(51) Int. Cl.
  *B60W 30/14* (2006.01)
  *B60W 50/06* (2006.01)
  *B60W 60/00* (2020.01)
  *G08G 1/16* (2006.01)
  *B60W 10/18* (2012.01)

(52) U.S. Cl.
  CPC ........... *B60W 60/001* (2020.02); *B60W 10/18* (2013.01); *B60W 2420/40* (2013.01); *B60W 2420/408* (2024.01)

(56) References Cited

U.S. PATENT DOCUMENTS

| | | | |
|---|---|---|---|
| 2018/0194280 A1 | 7/2018 | Shibata et al. | |
| 2019/0220011 A1* | 7/2019 | Della Penna | G07C 5/085 |
| 2019/0347879 A1* | 11/2019 | Motomura | G08G 1/16 |
| 2020/0001893 A1* | 1/2020 | Limbacher | B60W 50/085 |

FOREIGN PATENT DOCUMENTS

| | | |
|---|---|---|
| JP | 2011-073565 | 4/2011 |
| JP | 2016-103267 | 6/2016 |
| JP | 2017-154725 | 9/2017 |
| JP | 2018-097804 | 6/2018 |
| JP | 2018-135075 | 8/2018 |

OTHER PUBLICATIONS

Japanese Notice of Allowance for Japanese Patent Application No. 2020-540944 mailed Feb. 15, 2022.
Chinese Office Action for Chinese Patent Application No. 201880097105.X mailed May 31, 2022.

\* cited by examiner

VEHICLE CONTROL DEVICE, AUTOMATED DRIVING VEHICLE DEVELOPMENT SYSTEM, VEHICLE CONTROL METHOD, AND STORAGE MEDIUM FOR VERIFYING CONTROL LOGIC

TECHNICAL FIELD

The present invention relates to a vehicle control device, an automated driving vehicle development system, a vehicle control method, and a program.

BACKGROUND ART

In recent years, study on automatedly controlling driving of a vehicle (hereinafter, referred to as automated driving) has progressed. Meanwhile, there is a technique in which, in order to realize automated driving, a device mounted in a vehicle converts driving data measured by an in-vehicle sensor or the like into discrete data when an occupant is performing driving, and transmits the discrete data to an external server (for example, refer to Patent Literature 1).

CITATION LIST

Patent Literature

Patent Literature 1

Japanese Unexamined Patent Application, First Publication No. 2016-103267

SUMMARY OF INVENTION

Technical Problem

Generally, collected driving data is used to verify a developed control logic for automated driving. However, in the related art, the collected data is converted into discrete data in order to reduce a communication data amount, and therefore some information is lost and the control logic for automated driving tends to be insufficiently verified.

The present invention has been made in consideration of these circumstances, and one object of the present invention is to provide a vehicle control device, an automated driving vehicle development system, a vehicle control method, and a program capable of verifying a control logic in detail.

Solution to Problem

The vehicle control device, the automated driving vehicle development system, the vehicle control method, and the program according to the present invention employ the following configurations.

(1) According to an aspect of the present invention, there is provided vehicle control device including a first detector configured to detect a behavior of a vehicle; a second detector configured to detect a peripheral situation of the vehicle; a storage configured to store a control logic that outputs information indicating a behavior of the vehicle when at least information indicating the peripheral situation of the vehicle is input to the control logic; a deriver configured to execute the control logic to derive a behavior of the vehicle based on at least the peripheral situation of the vehicle detected by the second detector; and a determinator configured to compare a first behavior of the vehicle detected by the first detector at a certain reference time with a second behavior of the vehicle derived by the deriver based on the peripheral situation detected by the second detector at the reference time to determine whether or not the control logic is accurately operated.

(2) According to another aspect of the present invention, there is provided vehicle control device including a first detector configured to detect a behavior of a vehicle; a second detector configured to detect a peripheral situation of the vehicle; a storage configured to store a plurality of control logics that output information indicating a behavior of the vehicle when at least information indicating a peripheral situation of the vehicle is input to the control logics; a deriver configured to execute any control logic among the plurality of control logics to derive a behavior of the vehicle based on at least the peripheral situation of the vehicle detected by the second detector; and a determinator configured to compare a first behavior of the vehicle derived by the deriver having executed a certain first control logic among the plurality of control logics with a second behavior of the vehicle derived by the deriver having executed a second control logic of which the update date and time are later than the update date and time of the first control logic among the plurality of control logics to determine whether or not the second control logic is accurately operated.

(3) In the aspect of the above (2), the vehicle control device further includes a driving controller configured to cause the vehicle to travel by controlling a speed and steering of the vehicle based on the second behavior of the vehicle derived by the deriver having executed the second control logic.

(4) In the aspect of the above (2) or (3), the deriver derives the second behavior by executing the second control logic in accordance with a process load when the first behavior is derived by executing the first control logic.

(5) In the aspect of any one of the above (1) to (4), the determinator determines that the control logic is accurately operated in a case where the first behavior and the second behavior match each other, and determines that the control logic is not accurately operated in a case where the first behavior and the second behavior do not match each other.

(6) In the aspect of any one of the above (1) to (5), the determinator determines whether or not the first behavior and the second behavior match each other in a period until the vehicle travels a predetermined distance or until a predetermined time elapses, and determines that the control logic is accurately operated in a case where a ratio obtained by dividing a first number of times in which the first behavior and the second behavior match each other in the period by a sum of a second number of times in which the first behavior and the second behavior do not match each other in the period and the first number of times is equal to or higher than a predetermined ratio.

(7) In the aspect of the above (5) or (6), the vehicle control device further includes an output configured to output information; and an output controller configured to output, from the output, output information including at least information indicating the peripheral situation of the vehicle detected by the second detector in a case where the determinator determines that the first behavior and the second behavior do not match each other.

(8) In the aspect of the above (7), the control logic is learned based on training data in which the output information is correlated with identification information indicating a behavior of the vehicle to be output as a training label.

(9) In the aspect of the above (7) or (8), in a case where the determinator determines that the first behavior and the second behavior do not match each other, the output controller outputs the output information from the output to the storage to store the output information into the storage, or outputs the output information from the output to an external apparatus.

(10) In the aspect of any one of the above (7) to (9), the vehicle control device further includes a driving controller configured to cause the vehicle to travel by controlling a speed and steering of the vehicle based on the second behavior in a case where the determinator determines that the control logic is not accurately operated, and a predetermined condition is satisfied.

(11) In the aspect of any one of the above (7) to (10), in a case where the control logic is not accurately operated, the determinator further determines whether or not a driving operation of an occupant of the vehicle is a predetermined driving operation based on the peripheral situation of the vehicle detected by the second detector, and the vehicle control device further comprises a driving controller configured to cause the vehicle to travel by controlling a speed and steering of the vehicle based on the second behavior in a case where the determinator determines that the driving operation of the occupant of the vehicle is the predetermined driving operation.

(12) In the aspect of any one of the above (7) to (11), the determinator determines whether or not a third behavior of the vehicle detected by the first detector when an occupant performs a predetermined driving operation matches the second behavior in a period until the vehicle travels a predetermined distance or until a predetermined time elapses, and determines that the control logic is accurately operated in a case where a ratio obtained by dividing a third number of times in which the third behavior and the second behavior do not match each other in the period by a sum of a fourth number of times in which the third behavior and the second behavior match each other in the period and the third number of times is equal to or higher than a predetermined ratio.

(13) In the aspect of any one of the above (7) to (12), the vehicle control device further includes a first communicator configured to receive predetermined information regarding the control logic from an external apparatus that is an output destination of the output information; and a driving controller configured to cause the vehicle to travel by controlling a speed and steering of the vehicle based on the second behavior in a case where the predetermined information is received by the first communicator.

(14) According to still another aspect of the present invention, there is provided an automated driving vehicle development system including a plurality of vehicles configured to have the vehicle control device according to any one of the above (1) to (13) mounted therein; and a server apparatus including a second communicator configured to perform communication with each of the plurality of vehicles to acquire first information indicating the first behavior and second information indicating the second behavior from each of the plurality of vehicles, and a determiner configured to compare a set of the first behaviors indicated by a plurality of pieces of the first information acquired by the second communicator with a set of the second behaviors indicated by a plurality of pieces of the second information and to determine whether or not to permit automated driving in which the vehicle control device mounted in each of the plurality of vehicles causes the vehicle to travel by controlling a speed and steering of the vehicle based on the second behavior.

(15) In the aspect of the above (14), the determiner counts the number of combinations in which the first behavior and the second behavior match each other in the set of the first behaviors and the set of the second behaviors, and permits the vehicle control device to perform the automated driving in a case where a ratio obtained by dividing the counted number by the number of all combinations of the first behaviors and the second behaviors is equal to or higher than a predetermined ratio.

(16) In the aspect of the above (14) or (15), in a case where the vehicle control device is permitted to perform the automated driving, the determiner controls the second communicator to transmit predetermined information for permitting the automated driving based on the second behavior that is derived by executing the control logic, to each of the plurality of vehicles.

(17) According to still another aspect of the present invention, there is provided a vehicle control method of causing an in-vehicle computer including a first detector configured to detect a behavior of a vehicle, a second detector configured to detect a peripheral situation of the vehicle, and a storage configured to store a control logic that outputs information indicating a behavior of the vehicle when at least information indicating a peripheral situation of the vehicle is input to the control logic to execute the control logic to derive a behavior of the vehicle based on at least the peripheral situation of the vehicle detected by the second detector; and compare a first behavior of the vehicle detected by the first detector at a certain reference time with a second behavior of the vehicle derived by the deriver based on the peripheral situation detected by the second detector at the reference time to determine whether or not the control logic is accurately operated.

(18) According to still another aspect of the present invention, there is provided a program causing an in-vehicle computer including a first detector configured to detect a behavior of a vehicle, a second detector configured to detect a peripheral situation of the vehicle, and a storage configured to store a control logic that outputs information indicating a behavior of the vehicle when at least information indicating a peripheral situation of the vehicle is input to the control logic, to execute a process of executing the control logic to derive a behavior of the vehicle based on at least the peripheral situation of the vehicle detected by the second detector; and a process of comparing a first behavior of the vehicle detected by the first detector at a certain reference time with a second behavior of the vehicle derived by the deriver based on the peripheral situation detected by the second detector at the reference time to determine whether or not the control logic is accurately operated.

Advantageous Effects of Invention

According to the aspects of (1) to (18), it is possible to verify a control logic in detail.

DESCRIPTION OF EMBODIMENTS

Hereinafter, with reference to the drawings, a vehicle control device, an automated driving vehicle development system, a vehicle control method, and a program according to embodiments of the present invention will be described.

First Embodiment

Configuration of Automated Driving Vehicle Development System

Figure 1:
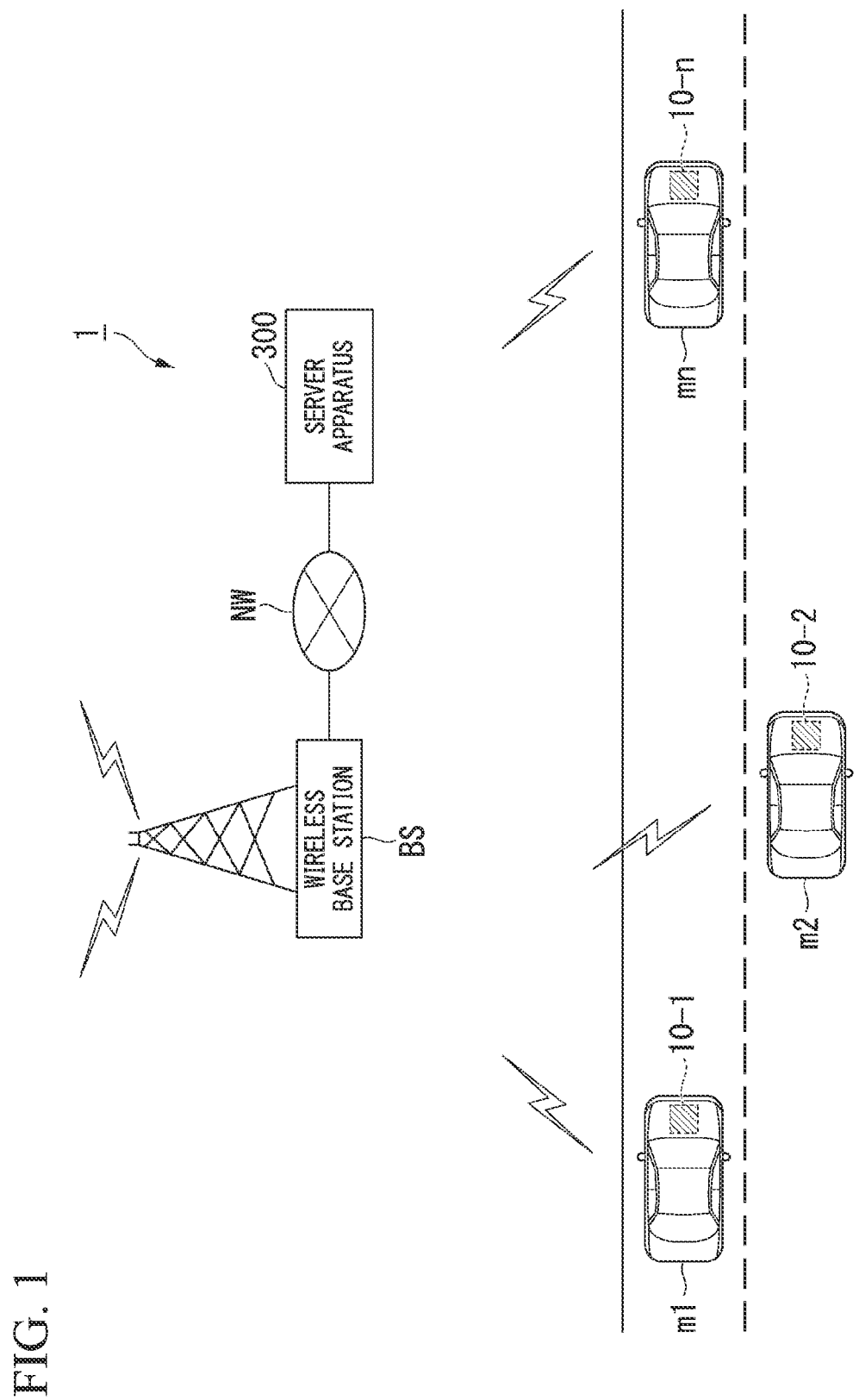
FIG. 1 is a diagram illustrating a configuration of an automated driving vehicle development system including a vehicle control system using a vehicle control device according to a first embodiment.

FIG. 1 is a configuration diagram illustrating an automated driving vehicle development system 1 including a vehicle control system 10 using a vehicle control device according to a first embodiment. The automated driving vehicle development system 1 includes, for example, vehicle control systems 10-1 to 10-n mounted in respective vehicles m, and a server apparatus 300. The apparatuses perform communication with each other via a wireless base station BS and a network NW.

For example, wireless communication using a mobile phone network or the like is performed between each of the vehicle control systems 10-1 to 10-n and the wireless base station BS, and wired communication using the network NW such as a wide area network (WAN) is performed between the wireless base station BS and the server apparatus 300. Each of the vehicle control systems 10-1 to 10-n and the server apparatus 300 may perform communication with each other by using a wireless communication device or the like provided at a road end. Hereinafter, the vehicle control systems 10-1 to 10-n will be simply referred to as the vehicle control system 10 as long as the vehicle control systems are not particularly differentiated from each other.

The vehicle control system 10 collects various pieces of data when the vehicle m is automatedly driven by automatedly controlling steering and a speed of the vehicle m or when the vehicle m is manually driven by an occupant. The vehicle m on which the vehicle control system 10-1 is mounted may be a vehicle used for non-commercial purposes such as a popular vehicle, or a vehicle used for commercial purposes such as a taxi, a bus, or a truck. The vehicle m on which the vehicle control system 10-1 is mounted may be a vehicle (a so-called test vehicle or probe vehicle) that performs test traveling for the purpose of developing a vehicle.

The server apparatus 300 receives the data collected by the vehicle control system 10, and provides the received data to a terminal apparatus of the vehicle control system 10 that may be used by a developer or the like. The server apparatus 300 is an example of an "external apparatus".

Configuration of Vehicle Control System

Figure 2:
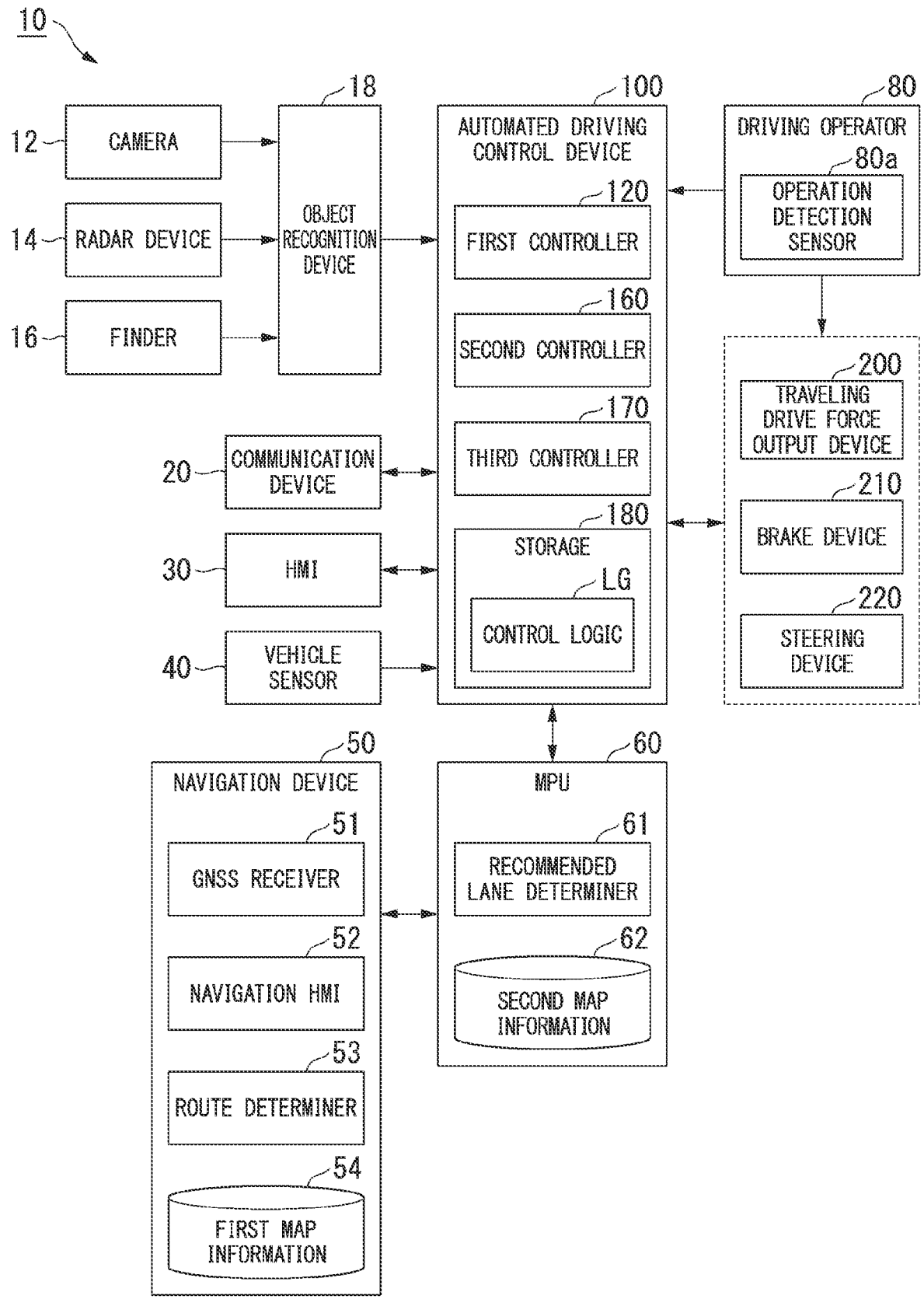
FIG. 2 is a diagram illustrating a configuration of the vehicle control system according to the first embodiment.

FIG. 2 is a configuration diagram illustrating the vehicle control system 10 according to the first embodiment. A vehicle (hereinafter, referred to as an own vehicle M) having the vehicle control system 10 mounted therein is, for example, a two-wheeled, three-wheeled, or four-wheeled vehicle, and a drive source thereof is an internal combustion engine such as a diesel engine or a gasoline engine, a motor, or a combination thereof. The motor is operated by using power generated by a generator connected to the internal combustion engine or power released from a secondary battery or a fuel cell.

The vehicle control system 10 includes, for example, a camera 12, a radar device 14, a finder 16, an object recognition device 18, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. The devices and the apparatuses are connected to each other via a multiplex communication line such as a controller area network (CAN) communication line, a serial communication line, or a wireless communication network. The configuration illustrated in FIG. 2 is only an example, and some of the constituents may be omitted, and other constituents may be added.

The camera 12 is a digital camera using a solid-state imaging element such as a charge coupled device (CCD) or a complementary metal oxide semiconductor (CMOS). The camera 12 is attached at any location in the own vehicle M). In a case where the front side is imaged, the camera 12 is attached to the upper part of a front windshield, the back surface of an interior mirror, or the like. For example, the camera 12 periodically and repeatedly images the periphery of the own vehicle M. The camera 12 may be a stereo camera.

The radar device 14 radiates electric waves such as millimeter waves in the periphery of the own vehicle M, detects electric waves (reflected waves) reflected by an object, and thus detects at least a position (a distance and an azimuth) of the object. The radar device 14 is attached at any location in the own vehicle M. The radar device 14 may detect a position and a speed of an object according to a frequency modulated continuous wave (FM-CW) method.

The finder 16 is light detection and ranging (LIDAR). The finder 16 applies light in the periphery of the own vehicle M, and measures scattered light. The finder 16 detects a distance to a target based on a time from light emission to light reception. The applied light is, for example, pulsed laser light. The finder 16 is attached at any location in the own vehicle M.

The object recognition device 18 performs a sensor fusion process on detection results from some or all of the camera 12, the radar device 14, and the finder 16, and thus recognizes a position, the type, a speed, and the like of an object. The object recognition device 18 outputs a recognition result to the automated driving control device 100. The object recognition device 18 may output detection results from the camera 12, the radar device 14, and the finder 16 to the automated driving control device 100 without change. The object recognition device 18 may be omitted from the vehicle control system 10. A combination of the camera 12, the radar device 14, and the finder 16 is an example of a "second detector", and a combination of the camera 12, the radar device 14, the finder 16, and the object recognition device 18 is another example of the "second detector".

The communication device 20 performs communication with another vehicle present in the periphery of the own vehicle M, or performs communication with the server apparatus 300 via the wireless base station by using wireless communication such as a cellular network, a Wi-Fi network, Bluetooth (registered trademark), or Dedicated Short Range Communication (DSRC). The communication device 20 is an example of an "output". The communication device 20 is an example of a "first communicator".

The HMI 30 presents various pieces of information to an occupant of the own vehicle M, and also receives an input operation from the occupant. The HMI 30 includes various display devices, a speaker, a buzzer, a touch panel, switches, keys, and the like.

The vehicle sensor 40 includes, for example, a vehicle speed sensor detecting a speed of the own vehicle M, an acceleration sensor detecting acceleration, a yaw rate sensor detecting an angular speed about a vertical axis, and an azimuth sensor detecting an orientation of the own vehicle M. The vehicle sensor 40 outputs a detection result to the automated driving control device 100. Hereinafter, the detection result from the vehicle sensor 40 will be referred to as "vehicle state information".

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory.

The GNSS receiver 51 identifies a position of the own vehicle M based on a signal received from a GNSS satellite. A position of the own vehicle M may be identified or complemented by an inertial navigation system (INS) using output from the vehicle sensor 40.

The navigation HMI 52 includes a display device, a speaker, a touch panel, keys, and the like. The navigation HMI 52 may be partially or entirely integrated into the HMI 30 described above.

The route determiner 53 determines, for example, a route (hereinafter, a route on a map) from a position of the own vehicle M identified by the GNSS receiver 51 (or any entered position) to a destination that is entered by an occupant by using the navigation HMI 52 based on the first map information 54. The first map information 54 is, for example, information in which a road shape is expressed by a link indicating a road and nodes connected to each other via the link. The first map information 54 may include a curvature of a road, point of interest (POI) information, and the like. The route on the map is output the MPU 60.

The navigation device 50 may perform route guidance using the navigation HMI 52 based on the route on the map. The navigation device 50 may be implemented, for example, by a function of a terminal apparatus such as a smartphone or a tablet terminal carried by the occupant. The navigation device 50 may transmit the current position and the destination to a navigation server via the communication device 20, and may acquire a route equivalent to the route on the map from the navigation server.

The MPU 60 includes, for example, a recommended lane determiner 61, and stores second map information 62 in a storage device such as an HDD or a flash memory. The recommended lane determiner 61 divides the route on the map provided from the navigation device 50 into a plurality of blocks (for example, divides the route on the map every 100 m in a vehicle advancing direction), and determines a recommended lane for each block by referring to the second map information 62. The recommended lane determiner 61 determines in which lane from the left the own vehicle will travel. In a case where there is a branch location on the route on the map, the recommended lane determiner 61 determines a recommended lane such that the own vehicle M can travel on a reasonable route to advance to a branch destination.

The second map information 62 is map information with higher accuracy than that of the first map information 54. The second map information 62 includes, for example, lane center information or lane boundary information, and lane type information. The second map information 62 may include road information, traffic regulation information, address information (address/postal code), facility information, telephone number information, and the like. The second map information 62 may be updated at any time by the communication device 20 performing communication with other devices.

The driving operator 80 includes, for example, an accelerator pedal, a brake pedal, a shift lever, a steering wheel, an odd-shaped steering wheel, a joystick, and other operators. Each operator included in the driving operator 80 is provided with an operation detection sensor 80*a*. The operation detection sensor 80*a* detects an operation amount indicating to what degree the operator is operated by representing a behavior of the own vehicle M, or presence or absence of an operation on the operator. For example, the operation detection sensor 80*a* outputs the detected operation amount or information indicating (hereinafter, referred to as user operation information) the detected presence or absence of the operation to the automated driving control device 100. The operation detection sensor 80*a* may output the user operation information to the traveling drive force output device 200, the brake device 210, and the steering device 220. The operation detection sensor 80*a* is an example of a "first detector".

The automated driving control device 100 includes, for example, a first controller 120, a second controller 160, a third controller 170, and a storage 180. Each of the first controller 120, the second controller 160, and the third controller 170 is realized, for example, by a processor such as a central processing unit (CPU) or a graphics processing unit (GPU) executing a program (software). Some or all of the first controller 120, the second controller 160, and the third controller 170 may be realized by hardware (a circuit portion; including a circuitry) such as a large scale integration (LSI), an application specific integrated circuit (ASIC), a field-programmable gate array (FPGA), or a graphics processing unit (GPU), and may be realized by software and hardware in cooperation. The program referred to by a processor may be stored in advance in the storage 180 of the automated driving control device 100, and may be stored in an attachable and detachable storage medium such as a DVD or a CD-ROM and may be installed in the storage 180 when the storage medium is attached to a drive device of the automated driving control device 100.

The storage 180 is implemented by, for example, an HDD, a flash memory, an electrically erasable programmable read only memory (EEPROM), a read only memory (ROM), or a random access memory (RAM). The storage 180 stores, for example, programs read and executed by the processor, and also stores a control logic LG.

The control logic LG is a program or a data structure representing a learned model such as a neural network. For example, the control logic LG includes dictionary data, a first logic, and a second logic.

The dictionary data is used to recognize an object. A template image or the like that is used as a comparison target during pattern matching is registered in the dictionary data.

The first logic is a model that is learned in advance to output information indicating an event described later, for example, when a sensor fusion process result from the object recognition device 18, or a detection result or the like from each of the camera 12, the radar device 14, and the finder 16 is input thereto. Hereinafter, the sensor fusion process result from the object recognition device 18, or the detection result from each of the camera 12, the radar device 14, and the finder 16 will be referred to as "external information".

The second logic is a model that is learned in advance to output a state of the own vehicle M in the future, for example, when information or the like output from the first logic is input thereto. The state of the own vehicle M in the future includes, for example, a position, a speed, an acceleration, a jerk, and a steering angle. The state of the own vehicle M in the future may include an operation timing or an operation time of a device such as a winker, a display, or a speaker.

Instead of the first logic and the second logic, the control logic LG may include a logic that is learned in advance to output a state of the own vehicle M in the future desired to be finally obtained when external information is input thereto without outputting information indicating an event that is an intermediate calculation result. In this case, for example, when the control logic LG is a neural network, the information indicating the event may be handled as a feature amount representing a calculation result of an intermediate layer of the neural network.

Figure 3:
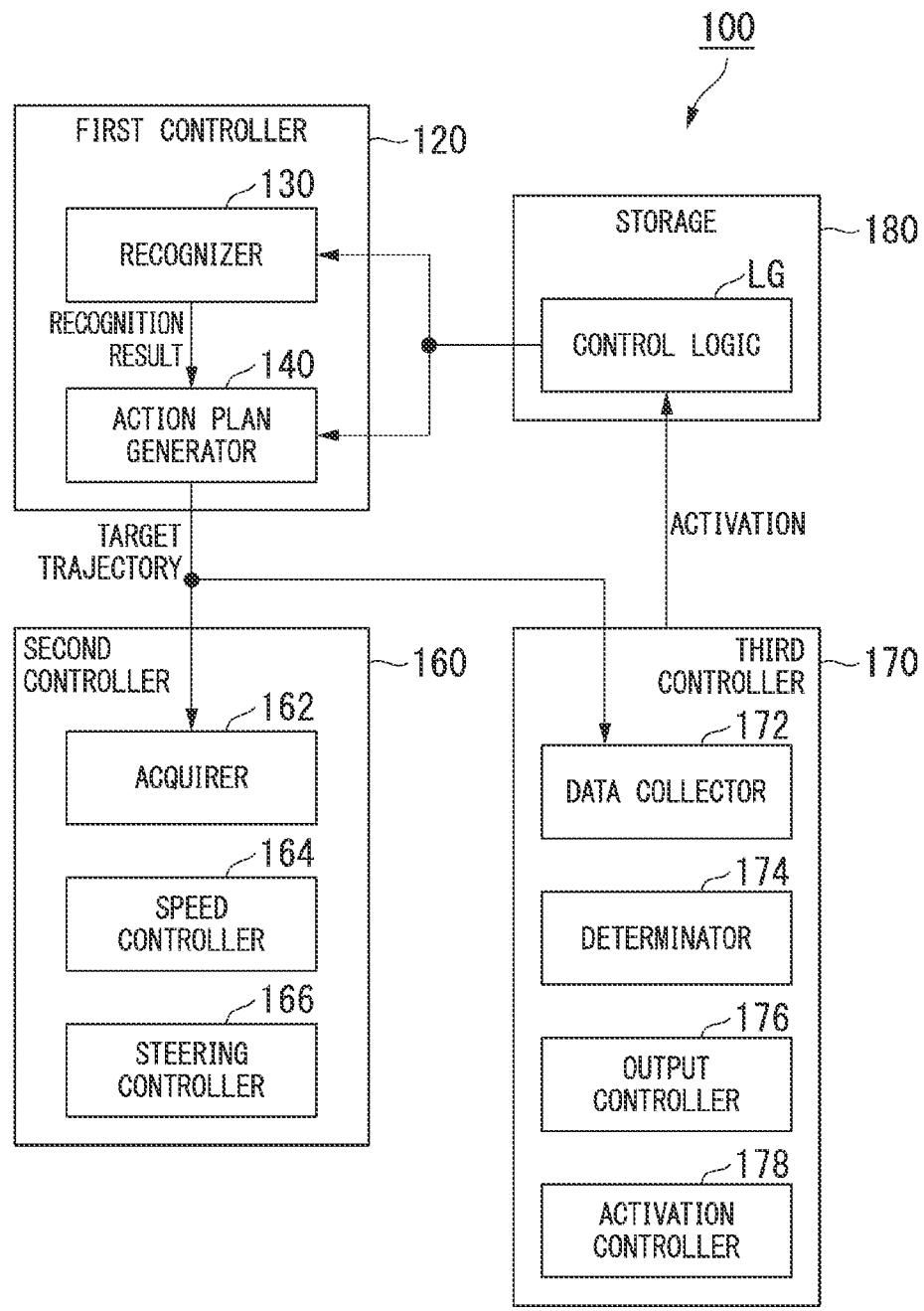
FIG. 3 is a diagram illustrating a functional configuration of a first controller 120, a second controller 160, and a third controller 170 in the first embodiment.

FIG. 3 is a diagram illustrating a functional configuration of the first controller 120, the second controller 160, and the third controller 170 according to a first embodiment. The first controller 120 includes, for example, a recognizer 130 and an action plan generator 140. The action plan generator 140 is an example of a "deriver".

The recognizer 130 and the action plan generator 140 are realized by combining, for example, a function of artificial intelligence (AI) with a function of a model provided in advance by referring to the control logic LG stored in the storage 180.

For example, a function of "recognizing an intersection" may be realized by executing recognition of the intersection using a machine learning method (deep learning) based on a deep neural network and recognition based on conditions (for example, there are a signal that can be matched with a pattern, and a road marking) given in advance in parallel, and scoring and comprehensively evaluating both of recognition results. Consequently, the reliability of automated driving is ensured.

The recognizer 130 recognizes states of an object, such as a position, a speed, and an acceleration in the vicinity of the own vehicle M based on the external information. The position of the object is recognized as, for example, a position in an absolute coordinate system having a representative point (for example, the centroid or the drive axis center) of the own vehicle M as an origin, and is used for control. The position of the object may be represented by a representative point such as the centroid or a corner of the object, and may be represented by a region of two or more dimensions. The "states" of the object may include an acceleration, a jerk, or an "action state" of the object (for example, the object is trying to change lanes or whether or not the object is trying to change lanes).

The recognizer 130 refers to, for example, the dictionary data of the control logic LG to recognize a lane (hereinafter, referred to as an own lane) in which the own vehicle M is traveling or an adjacent lane that is adjacent to the own lane. For example, in a case where a pattern (for example, an arrangement of solid lines and dashed lines) of road lane markings is registered as a template image in the dictionary data, the recognizer 130 performs pattern matching between the pattern of the road lane markings of the template image and a pattern of road lane markings of an image captured by the camera 12, and thus recognizes the own lane or the adjacent lane.

The recognizer 130 may refer to the dictionary data of the control logic LG to recognizes an object representing a lane boundary (road boundary) such as a road lane marking, a road shoulder, a curb, a median strip, and a guardrail, and may thus recognize the own lane or the adjacent lane based on a relative positional relationship with a position of the recognized object representing the lane boundary. In this recognition, a position of the own vehicle M acquired from the navigation device 50 or a process result from an INS may be taken into consideration.

The recognizer 130 may recognize a temporary stop line, an obstacle, a red light, a tollgate, or other objects by referring to the dictionary data of the control logic LG.

When the own lane is recognized, the recognizer 130 recognizes a relative position or a posture of the own vehicle M with respect to the own lane. The recognizer 130 may recognize, for example, a deviation of a reference point of the own vehicle M from the lane center and an angle formed with a line connecting the lane centers in an advancing direction of the own vehicle M as the relative position and the posture of the own vehicle M with respect to the own lane. Alternatively, the recognizer 130 may recognize a position or the like of the reference point of the own vehicle M with respect to either of side ends (road lane markings or road boundaries) of the own lane as the relative position of the own vehicle M with respect to the own lane.

The action plan generator 140 generates a target trajectory defining a state such as a position or a speed of the own vehicle M in the future in accordance with a change in a peripheral situation during traveling of the own vehicle M and a state of the own vehicle M based on the control logic LG.

For example, of sensor detection results from the camera 12, the radar device 14, the finder 16, and the like or a recognition result from the recognizer 130 and vehicle state information that is a detection result from the vehicle sensor 40, the action plan generator 140 inputs at least the sensor detection results or the recognition result from the recognizer 130 (preferably, both of the sensor detection results or the recognition result from the recognizer 130 and the vehicle state information) to the first logic of the control logic LG, and thus determines events in automated driving on a route on which a recommended lane is determined. The events are information defining a traveling aspect of the own vehicle M.

The events include, for example, a constant speed traveling event in which the own vehicle M travels in the same lane at a constant speed, a following traveling event in which the own vehicle M follows another vehicle (hereinafter, referred to as a preceding vehicle) that is present within a predetermined distance (for example, within 100 [m]) in front of the own vehicle M and is closest to the own vehicle M, a lane change event of changing lanes of the own vehicle M from the own lane to the adjacent lane, a branch event in which the own vehicle M travels in a target lane at a road branch point, a merging event of merging the own vehicle M with a main lane at a merging point, and a takeover event for switching manual driving by finishing automated driving. The "following" may be, for example, a traveling aspect in which a relative distance (inter-vehicle distance) between the own vehicle M and a preceding vehicle is constant, and may be a traveling aspect in which the own vehicle M travels at the center of the own lane in addition to a relative distance between the own vehicle M and a preceding vehicle being constant. The events may include, for example, a passing event in which the lane of the own vehicle M is temporarily changed to an adjacent lane, the own vehicle M passes a preceding vehicle in the adjacent lane, and the lane is then changed to the original lane, and an avoidance event in which the own vehicle M performs at least one of braking and steering in order to avoid an obstacle present in front of the own vehicle M.

When an event representing a traveling aspect of the own vehicle M based on the first logic, the action plan generator 140 inputs information indicating the event to the second logic of the control logic LG to generate a target trajectory of the own vehicle M in the future for causing the own vehicle M to automatedly (regardless of a driver's operation) travel in the traveling aspect defined by the event. The target trajectory includes an element representing a state such as a position or a speed of the own vehicle M in the future.

For example, the action plan generator 140 generates a target trajectory in which a plurality of locations (trajectory points) to be sequentially reached by the own vehicle M are included as position elements of the own vehicle M in the future. The trajectory points are locations to be reached by the own vehicle M every predetermined traveling distance (for example, about several [m]). The predetermined traveling distance may be computed based on a distance along a road when the own vehicle M advances along a route.

The action plan generator 140 generates a target trajectory in which a target speed and a target acceleration for each predetermined sampling time (for example, any of about 0.1 to 0.9 seconds) are included as speed elements of the own vehicle M in the future. A trajectory point may be a position to be reached by the own vehicle M at a sampling time point every predetermined sampling time. In this case, the target speed or the target acceleration may be determined by a sampling time and an interval between trajectory points. The action plan generator 140 outputs information (hereinafter, referred to as target trajectory information) indicating the generated target trajectories to the third controller 170.

The action plan generator 140 outputs the target trajectory information to the second controller 160 in addition to or instead of the third controller 170 in a case where the control logic LG is activated by an activation controller 178 described later.

In a case where the target trajectory information is output from the action plan generator 140, that is, the control logic LG is activated, the second controller 160 controls the traveling drive force output device 200, the brake device 210, and the steering device 220 such that the own vehicle M can pass along the target trajectory generated by the action plan generator 140 as scheduled.

The second controller 160 includes, for example, an acquirer 162, a speed controller 164, and a steering controller 166. A combination of the action plan generator 140 and the second controller 160 is an example of a "driving controller".

The acquirer 162 acquires information regarding the target trajectory (trajectory point) generated by the action plan generator 140, and stores the information into a memory of the storage 180.

The speed controller 164 controls one or both of the traveling drive force output device 200 and the brake device 210 based on a speed element (for example, a target speed or a target acceleration) included in the target trajectory stored in the memory.

The steering controller 166 controls the steering device 220 according to a position element (for example, a curvature representing a curved state of the target trajectory) included in the target trajectory stored in the memory.

Processes in the speed controller 164 and the steering controller 166 are realized by a combination of, for example, feedforward control and feedback control. As an example, the steering controller 166 executes a combination of feedforward control based on a curvature of a road in front of the own vehicle M and feedback control based on deviation from the target trajectory.

The traveling drive force output device 200 outputs a traveling drive force (torque) for traveling of the vehicle to drive wheels. The traveling drive force output device 200 includes, for example, a combination of an internal combustion engine, a motor, and a transmission, and a power electronic control unit (ECU) controlling the constituents. The power ECU controls the constituents according to information that is input from the second controller 160 or information that is input from the driving operator 80.

The brake device 210 includes, for example, a brake caliper, a cylinder that transmits hydraulic pressure to the brake caliper, an electric motor that generates the hydraulic pressure in the cylinder, and a brake ECU. The brake ECU controls the electric motor based on information that is input from the second controller 160 or information that is input from the driving operator 80, so that brake torque corresponding to a braking operation is output to each vehicle wheel. The brake device 210 may include a mechanism, as a backup, transmitting hydraulic pressure generated by operating the brake pedal included in the driving operator 80, to the cylinder via a master cylinder. The brake device 210 may be an electronic control type hydraulic brake device that controls an actuator according to information that is input from the second controller 160 and thus transmits hydraulic pressure in a master cylinder to the cylinder.

The steering device 220 includes, for example, a steering ECU and an electric motor. The electric motor changes an orientation of a turning wheel by applying force to, for example, a rack-and-pinion mechanism. The steering ECU drives the electric motor based on information that is input from the second controller 160 or information that is input from the driving operator 80, so that an orientation of the turning wheel is changed.

The third controller 170 includes, for example, a data collector 172, a determinator 174, an output controller 176, and an activation controller 178.

The data collector 172 repeatedly, in a predetermined cycle, collects (acquires) external information from the object recognition device 18, or the camera 12, the radar device 14, and the finder 16, collects (acquires) vehicle state information from the vehicle sensor 40, or collects (acquires) user operation information from each operation detection sensor 80a of the driving operator 80. Hereinafter, such collected information will be collectively referred to as "collected data". The data collector 172 stores the collected data into the storage 180. The data collector 172 may acquire target trajectory information from the action plan generator 140. Under manual driving, the collected data including some or all of the vehicle state information output from the vehicle sensor 40, the external information output from the object recognition device 18, or the camera 12, the radar device 14, and the finder 16, the user operation information, and the target trajectory information is an example of "output information".

The determinator 174 compares the user operation information collected by the data collector 172 with the target trajectory information output from the action plan generator 140 to determine whether or not the control logic LG stored in the storage 180 of the own vehicle M is accurately operated.

For example, the determinator 174 determines whether or not a behavior of the own vehicle M indicated by the user operation information, that is, a behavior (an example of a "first behavior") of the own vehicle M in a case where an occupant performs manual driving matches a behavior of the own vehicle M indicated by the target trajectory information, that is, a behavior (an example of a "second behavior") of the own vehicle M in a case of assuming automated driving, determines that the control logic LG stored in the storage 180 of the own vehicle M is accurately operated in a case where the behaviors match each other, and determines that the control logic LG stored in the storage 180 of the own vehicle M is not accurately operated in a case where the behaviors do not match each other. The "case of assuming automated driving" is a case where the control logic LG is not activated, and the target trajectory information is not output to the second controller 160 only due to generation of a target trajectory.

For example, the determinator 174 compares an operation amount for each operator included in the user operation information with an operation amount for each operator derived when each element (a speed, a position, or the like) included in the target trajectory is set as a control amount, determines that the respective behaviors match each other in a case where a difference between the operation amounts for the operators is within a predetermined error range (for example, within about several [%] range), and determines that the behaviors do not match each other in other cases. In this case, an error range may differ for each operator. For example, a predetermined error range for a difference in an operation amount (an accelerator pedal opening or the like) of the accelerator pedal may be 0% to 5%, a predetermined error range for a difference in an operation amount (a brake pedal opening or the like) of the brake pedal may be 0% to 7%, and a predetermined error range for a difference in an operation amount (a steering torque, a steering angle, or the like) of the steering wheel may be 0% to 10%. These numerical value ranges are only examples and may be changed to any numerical value ranges.

The determinator 174 may determine that the respective behaviors match each other in a case where an advancing direction of the own vehicle M when an occupant performs manual driving matches an advancing direction of the own vehicle M in a case of assuming automated driving, and may determine that the behaviors do not match each other in a case where the advancing direction of the own vehicle M when the occupant performs manual driving does not match the advancing direction of the own vehicle M in a case of assuming automated driving. For example, the determinator 174 may determine that an advancing direction of the own vehicle M when the occupant performs manual driving and an advancing direction of the own vehicle M in a case of assuming automated driving match each other in a case where a difference in an operation amount for the steering wheel is within a predetermined error range, that is, a difference in a steering angle is within a predetermined error range, and may determine that the advancing directions do not match each other in other cases.

The determinator 174 may count the number of times (hereinafter, referred to as a first matching number of times) in which a behavior of the own vehicle M under manual driving matches a behavior of the own vehicle M under virtual automated driving until the own vehicle M travels a predetermined distance or until a predetermined time elapses, count the number of times (hereinafter, referred to as a first mismatching number of times) in which the behaviors do not match each other, determine that the control logic LG stored in the storage 180 of the own vehicle M is accurately operated in a case where a ratio obtained by dividing the first matching number of times by a total number of times (a sum of the first matching number of times and the first mismatching number of times) is equal to or higher than a predetermined ratio (for example, about 95%), and determine that the control logic LG stored in the storage 180 of the own vehicle M is not accurately operated in a case where the ratio obtained by dividing the matching number of times by the total number of times lower than the predetermined ratio. The first matching number of times is an example of a "first number of times", and the first mismatching number of times is an example of a "second number of times".

In a case where it is determined by the determinator 174 that the control logic LG stored in the storage 180 of the own vehicle M is not accurately operated, the output controller 176 controls the communication device 20 to transmit the collected data to the server apparatus 300.

The activation controller 178 receives activation feasibility information indicating permission for activation of the control logic LG or prohibition thereof from the server apparatus 300 via the communication device 20, and activates the control logic LG based on the received activation feasibility information.

For example, in a case where the activation feasibility information indicating permission for activation is received, the activation controller 178 may enable some or all of the functions of the dictionary data, the first logic, and the second logic of the control logic LG to activate the control logic LG. Consequently, the second controller 160 can control steering and a speed of the own vehicle M based on the target trajectory such that the own vehicle M is subjected to automated driving.

In a case where the activation feasibility information indicating prohibition of activation is received, the activation controller 178 may disable all of the functions of the dictionary data, the first logic, and the second logic of the control logic LG to deactivate the control logic LG. Consequently, since the target trajectory information is not output from the action plan generator 140 to the second controller 160, steering and a speed of the own vehicle M are not controlled (automated driving is not performed), only comparison between an operation amount for the driving operator 80 under manual driving and an operation amount for the driving operator 80 under virtual automated driving is performed.

The activation controller 178 may activate or deactivate the control logic LG in accordance with a determination result from the determinator 174 regardless of the activation feasibility information. For example, the activation controller 178 may activate the control logic LG when it is determined by the determinator 174 that the control logic LG stored in the storage 180 of the own vehicle M is accurately operated, and may deactivate the control logic LG in other cases.

Process Flow

Figure 4:
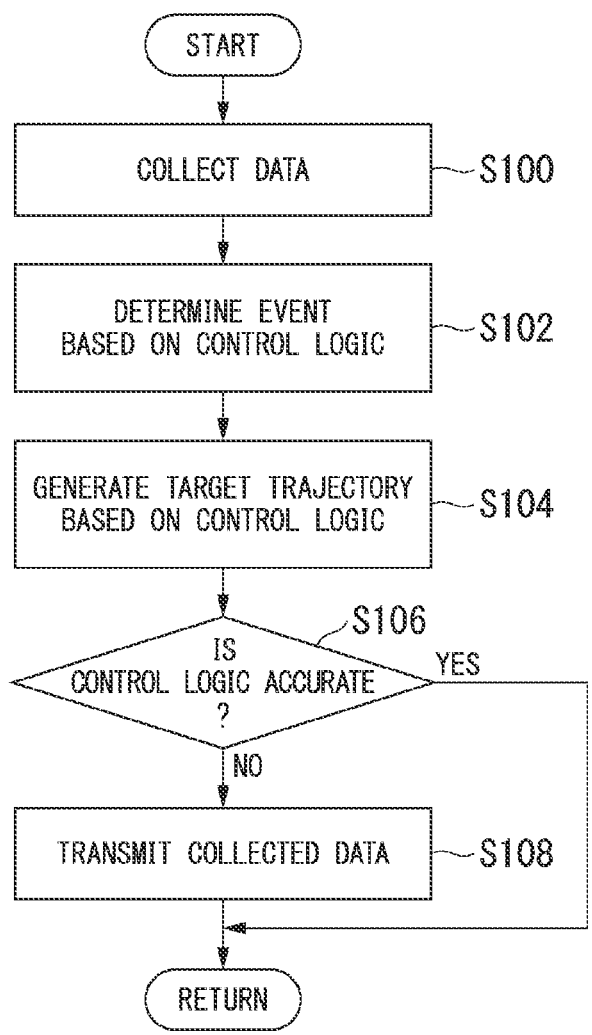
FIG. 4 is a flowchart illustrating an example of a flow of a series of processes during transmission of collected data.

Hereinafter, a description will be made of a flow of a series of processes during transmission of collected data with reference to a flowchart. FIG. 4 is a flowchart illustrating an example of a flow of a series of processes during transmission of collected data. For example, the processes in this flowchart may be repeatedly performed, for example, in a predetermined cycle.

First, the data collector 172 collects external information, vehicle state information, and user operation information as collected data (step S100).

Next, the action plan generator 140 determines events of automated driving on a route on which a recommended lane is determined, by using the external information that is detection results from the object recognition device 18, or the camera 12, the radar device 14, and the finder 16, and the vehicle state information that is a detection result from the vehicle sensor 40 based on the control logic LG (step S102).

Next, the action plan generator 140 generates a target trajectory of the own vehicle M in the future by using an event in each section of the route based on the control logic LG (step S104).

Next, the determinator 174 compares a behavior of the own vehicle M under manual driving, indicated by the user operation information collected by the data collector 172 with a behavior of the own vehicle M under virtual automated driving, indicated by the target trajectory information output from the action plan generator 140, and thus determines whether or not the control logic LG stored in the storage 180 of the own vehicle M is accurately operated (step S106).

In a case where it is determined by the determinator 174 that the control logic LG is not accurately operated, the output controller 176 controls the communication device 20 to transmit the collected data to the server apparatus 300 (step S108). In this case, the output controller 176 may transmit the target trajectory information as the collected data in addition to the external information, the vehicle state information, and the user operation information.

On the other hand, in a case where it is determined by the determinator 174 that the control logic LG is accurately operated, the output controller 176 omits the process in step S108 and does not transmit the collected data to the server apparatus 300. Consequently, the processes in this flowchart are finished.

In the description of the flowchart, the description will be made of a case where the output controller 176 controls the communication device 20 to transmit the collected data to the server apparatus 300 when it is determined by the determinator 174 that the control logic LG is not accurately operated, but the present invention is not limited thereto. For example, in a case where it is determined by the determinator 174 that the control logic LG is not accurately operated, the output controller 176 may store the collected data into a non-transitory storage medium such as an HDD included in the storage 180 by outputting the collected data to the non-transitory storage medium. In this case, for example, during vehicle inspection, a car dealer may copy the collected data from the storage medium storing the collected data to another storage medium, and may upload the copied collected data from the storage medium to the server apparatus 300. In this case, a communication interface (not illustrated) connected to the non-transitory storage medium such as the HDD included in the storage 180 is another example of an "output". The communication interface connected to the non-transitory storage medium may include, for example, a direct memory access controller.

Figure 5:
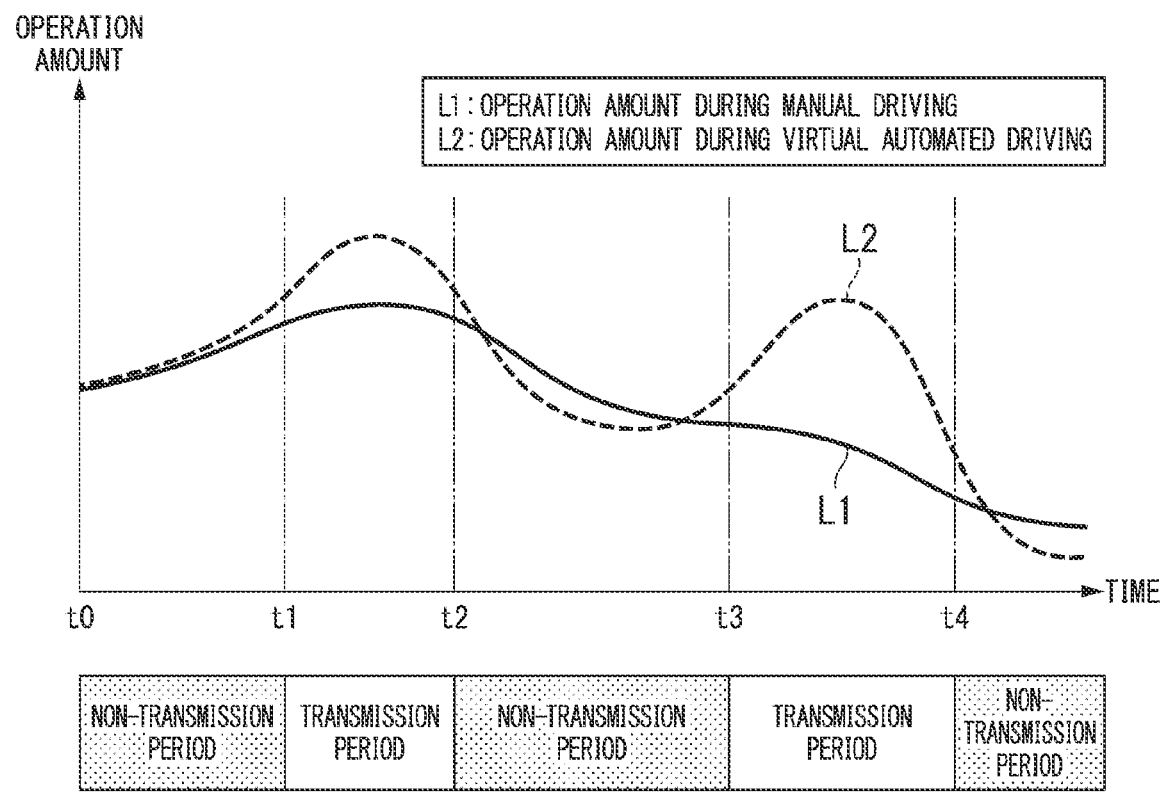
FIG. 5 is a diagram for describing collected data that is a transmission target and collected data that is a non-transmission target.

FIG. 5 is a diagram for describing collected data that is a transmission target and collected data that is a non-transmission target. In FIG. 5, a transverse axis expresses time, and a longitudinal axis expresses an operation amount. A solid line L1 represents a change in an operation amount for the driving operator 80 under manual driving, and a dashed line L2 represents a change in an operation amount for the driving operator 80 under virtual automated driving.

For example, in a period from time point t0 to time point t1, a period from time point t2 to time point t3, and a period after time point t4, a difference between L1 and L2 is within a predetermined error range, and it is determined by the determinator 174 that a behavior of the own vehicle M under the manual driving matches a behavior of the own vehicle M under the virtual automated driving. Thus, the output controller 176 does not transmit, to the server apparatus 300, collected data that is collected in each of the period from time point t0 to time point t1, the period from time point t2 to time point t3, and the period after time point t4.

On the other hand, in a period from time point t1 to time point t2, and a period from time point t3 to time point t4, a difference between L1 and L2 is not within the predetermined error range, and it is determined by the determinator 174 that a behavior of the own vehicle M under the manual driving does not match a behavior of the own vehicle M under the virtual automated driving. Thus, the output controller 176 transmits, to the server apparatus 300, collected data that is collected in each of the period from time point t1 to time point t2, and the period from time point t3 to time point t4.

For example, the output controller 176 may transmit the collected data that is collected in the period from time point t1 to time point t2 to the server apparatus 300 at any timing (time point) after time point t2, and may transmit the collected data that is collected in the period from time point t3 to time point t4 to the server apparatus 300 at any timing (time point) after time point t4. More specifically, the output controller 176 may transmit the collected data at a timing at which the determination result that the behaviors do not match each other changes to the determination result that the behaviors match each other, and may transmit the collected data at a timing at which the own vehicle M is parked at home or in a parking lot. The output controller 176 may transmit the collected data in a case where the own vehicle M is traveling in a section such as an expressway in which the constant speed traveling event may be planned.

Configuration of Server Apparatus

Figure 6:
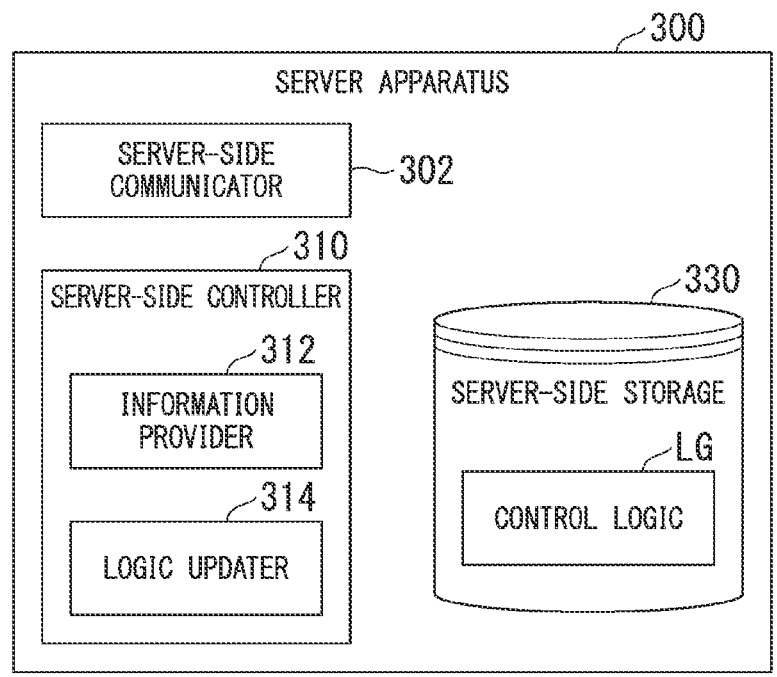
FIG. 6 is a diagram illustrating a configuration of a server apparatus according to the first embodiment.

FIG. 6 is a diagram illustrating a configuration of the server apparatus 300 according to the first embodiment. The server apparatus 300 includes, for example, a server-side communicator 302, a server-side controller 310, and a server-side storage 330.

The server-side communicator 302 includes, for example, a communication interface such as a network interface card (NIC). The server-side communicator 302 performs communication with the vehicle control system 10 of each vehicle via the network NW, and receives collected data from the vehicle control system 10 of each vehicle. The server-side communicator 302 is an example of a "second communicator".

The server-side controller 310 includes, for example, an information provider 312 and a logic updater 314. The constituents are realized by a hardware processor (or a processor circuit) such as a CPU or a GPU executing a program (software) stored in the server-side storage 330. Some or all of the plurality of constituents may be realized by hardware (a circuit portion: circuitry) such as an LSI, an ASIC, or an FPGA, and may be realized by software and hardware in cooperation. The program may be stored in advance in the server-side storage 330, and may be stored in an attachable and detachable storage medium such as a DVD or a CD-ROM and may be installed in the server-side storage 330 from the storage medium when the storage medium is attached to a drive device of the server apparatus 300.

The server-side storage 330 is implemented by a storage device such as an HDD, a flash memory, an EEPROM, a ROM, or a RAM. The server-side storage 330 stores not only various programs such as firmware and application programs but also the control logic LG.

When collected data is received by the server-side communicator 302 from the vehicle control system 10, the information provider 312 provides a screen for inquiring whether or not the collected data is used as training data for the control logic LG to a terminal apparatus of a developer via a website or the like. The training data is, for example, data in which, in a case where the control logic LG is a neural network, data given as an example is correlated with data that is the correct answer to the example in advance. The terminal apparatus of the developer may be, for example, a mobile phone such as a smartphone, a tablet terminal, or any of various personal computers.

For example, the logic updater 314 updates the control logic LG by learning the control logic LG through supervised learning based on the collected data received by the server-side communicator 302. The logic updater 314 is an example of a "determiner".

Figure 7:
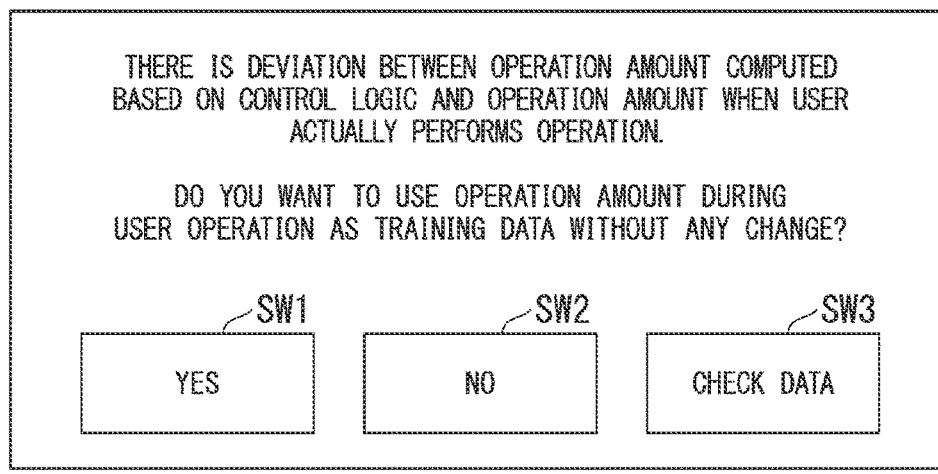
FIG. 7 is a diagram illustrating an example of a screen displayed on a terminal apparatus of a developer.

FIG. 7 is a diagram illustrating an example of a screen displayed on the terminal apparatus of the developer. For example, the information provider 312 may display, on the screen of the terminal apparatus of the developer, a deviation between an operation amount for the driving operator 80 under manual driving and an operation amount for each operator assumed under virtual automated driving, corresponding to the reason why the collected data is transmitted from the vehicle control system 10, with text or an image. Switches (SW1 and SW2 in FIG. 7) for requesting consent for re-learning the control logic LG may be displayed on the screen of the terminal apparatus of the developer by using the vehicle state information and the external information included in the collected data as training data. A switch SW3 for allowing the developer to check the collected data before determining whether or not an operation amount for the driving operator 80 under manual driving is used as training data may be displayed on the screen of the terminal apparatus of the developer.

For example, in a case where the switch SW1 is operated on the screen of the terminal apparatus, the logic updater 314 generates training data in which identification information indicating a behavior of the vehicle to be output as a training label is correlated with the vehicle state information and the external information included in the collected data. When there are such vehicle state information and external information, the training data represents that each element of a target trajectory output from the control logic LG is to be a control amount corresponding to the correct answer. The training label may be a control amount derived based on an operation amount for the driving operator 80 under manual driving, deviating from an operation amount for each operator assumed under virtual automated driving.

When the training data is generated, the logic updater 314 updates the control logic LG to the new control logic LG by learning the current control logic LG based on the training data.

Figure 8:
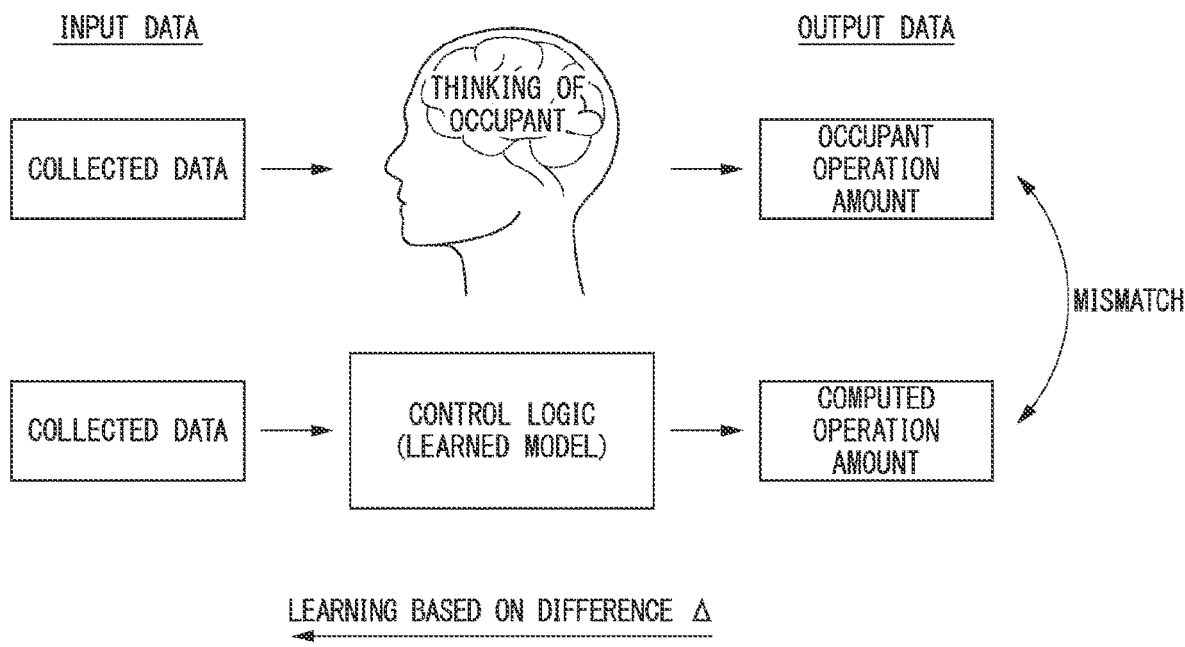
FIG. 8 is a diagram schematically illustrating a scene in which a control logic is updated.

FIG. 8 is a diagram schematically illustrating a scene of updating the control logic LG. For example, under manual driving, an operation amount for the driving operator 80 is an amount that is intuitively (unconsciously) determined by an occupant. On the other hand, under virtual automated driving, an operation amount for the driving operator 80 is an amount that is determined by the control logic LG. In order to bring the control logic LG close to the thinking of the occupant, it is necessary to learn the control logic LG with driving of the occupant as the correct answer. Thus, the logic updater 314 uses an operation amount for the driving operator 80 (in the figure, an occupant operation amount) under manual driving as training data, and learns the control logic LG by using a gradient method such as probability theory or backpropagation such that a difference Δ between an operation amount (in the figure, a computed operation amount) of the driving operator 80 computed by the control logic LG and the occupant operation amount that is the training data is small. Consequently, it is possible to perform update the control logic LG to be closer to the thinking of the occupant.

In a case where the switch SW2 is operated on the screen of the terminal apparatus, the logic updater 314 excludes the vehicle state information and the external information included in the collected data from training data.

In a case where the switch SW3 is operated on the screen of the terminal apparatus, the information provider 312 displays the vehicle state information or the external information included in the collected data with a video, a graph, or a numerical value. Consequently, the developer can check which of manual driving and automated driving is correct driving when an operation amount (occupant operation amount) of the driving operator 80 under the manual driving and an operation amount (computed operation amount) of each operator assumed under the virtual automated driving deviate from each other, while visually checking images from the camera 12.

For example, in a case where a target trajectory in which the own vehicle M is maintained in the lane center is generated, when an occupant greatly operates the steering wheel to change the lane of the own vehicle M to an adjacent lane, it may be determined that there is a high probability that an object or an event to be avoided, not recognized by the recognizer 130, may be present in front of the own vehicle M. In this case, when the developer visually checks images or the like from the camera 12 and finds that an object or an event to be avoided is present in front of the own vehicle M, it may be concluded that manual driving of the occupant is correct. In this case, in order to update the control logic LG, the developer operates the switch SW1 on the screen of the terminal apparatus, and uses the vehicle state information and the external information included in the collected data as training data.

On the other hand, in a case where the developer cannot find that an object or an event to be avoided is present in front of the own vehicle M from the image of the camera 12 or the like, it cannot be concluded that manual driving of the occupant is correct. In this case, in order not to learn the control logic LG by using the collected data that causes obscure situation determination, the developer operates the switch SW2 on the screen of the terminal apparatus, and excludes the vehicle state information and the external information included in the collected data from training data.

As described above, the developer selects collected data used as training data for the control logic LG, and can thus generate the control logic LG with higher accuracy (closer to the thinking of the occupant).

In a case where the collected data from each of a plurality of vehicles (including the own vehicle M) having the vehicle control system 10 mounted therein is aggregated in the server apparatus 300, the developer may download the collected data aggregated in the server apparatus 300 to the terminal apparatus thereof, and may statistically process the vehicle state information, the external information, the user operation information, and the target trajectory information included in the downloaded collected data of each vehicle to generate training data for the control logic LG. In this case, the developer may upload the generated training data to the server apparatus 300 by using the terminal apparatus. When the training data is uploaded from the terminal apparatus of the developer, the logic updater 314 updates the control logic LG to the new control logic LG by learning the current control logic LG based on the training data.

In a case where update of the control logic LG is completed, the logic updater 314 may control the server-side communicator 302 to transmit the updated control logic LG and activation feasibility information indicating permission for activation to the vehicle control system 10 of each vehicle. Consequently, the vehicle control system 10 of each vehicle can activate the updated control logic LG and thus perform automated driving.

In a case where the updated control logic LG and the activation feasibility information indicating permission for activation are received, the vehicle control system 10 may deactivate the updated control logic LG, derive a behavior of the own vehicle M assumed under virtual automated driving based on the deactivated control logic LG, determine whether or not the derived behavior matches a behavior of the own vehicle M under the current manual driving, and activate the deactivated control logic LG in a case where it is determined that the behaviors match each other. As described above, the control logic LG updated by the server apparatus 300 may be activated after being first verified on the vehicle side instead of immediately being activated.

In a case where the collected data from each of a plurality of vehicles having the vehicle control system 10 mounted therein is aggregated into the server apparatus 300, the logic updater 314 may compare the pieces of collected data with each other, and may determine whether or not activation of the updated control logic LG is permitted without updating the updated control logic LG (the control logic LG stored in the storage 180 of each vehicle).

For example, in a case where the server-side communicator 302 receives the collected data including the user operation information and the target trajectory information from each of a plurality of vehicles, the logic updater 314 may compare a first population that is a group of behaviors of the respective vehicles (behaviors of the respective vehicles under manual driving) indicated by the user operation information with a second population that is a group of behaviors (behaviors of the respective vehicles under virtual automated driving) of the respective vehicles indicated by the target trajectory information, to determine whether or not activation of the updated control logic LG is permitted.

More specifically, the logic updater 314 may count the number of combinations in which a behavior (an example of a first behavior) of each of a plurality of vehicles under the manual driving included in the first population and a behavior (an example of a second behavior) of each of the plurality of vehicles under the virtual automated driving included in the second population, and may control the server-side communicator 302 to transmit activation feasibility information indicating permission for activation to the vehicle control system 10 of each vehicle in order to permit activation of the updated control logic LG in a case where a ratio obtained by dividing the counted number of combinations by the number of all combinations (a sum of the number of combinations in which the behaviors match each other and the number of combinations in which the behaviors do not match each other) is equal to or higher than a predetermined ratio (for example, 95%). On the other hand, in a case where the ratio obtained by dividing the counted number of combinations by the number of all combinations is lower than the predetermined ratio, the logic updater 314 may control the server-side communicator 302 to transmit activation feasibility information indicating prohibition of activation to the vehicle control system 10 of each vehicle in order to prohibit activation of the updated control logic LG. As described above, since the server apparatus 300 acquires the collected data from each of a plurality of vehicles having the vehicle control system 10 mounted therein and determines whether or not to permit activation of the control logic LG, a larger volume of collected data can be accumulated in the server apparatus 300 more quickly than in a case of collecting various pieces of information such as the vehicle state information, the external information, the user operation information, and the target trajectory information from a single vehicle (for example, only the own vehicle M), and thus it is possible to verify the control logic LG in a shorter period of time. The control logic LG is verified based on a larger volume of collected data, and thus it is possible to test (verify) the control logic LG with higher accuracy.

When the first population is compared with the second population, the logic updater 314 may count the number of combinations of behaviors for which the developer can conclude that manual driving of the occupant is correct, and may control the server-side communicator 302 to transmit activation feasibility information indicating permission for activation to the vehicle control system 10 of each vehicle in order to permit activation of the updated control logic LG in a case where a ratio obtained by dividing the counted number by the number of all combinations is lower than a predetermined ratio (for example, 5%).

According to the above-described first embodiment, there are provided the communication device 20 (an example of an output) that transmits information; the operation detection sensor 80a (an example of a first detector) that detects an operation amount for the driving operator 80 as a behavior of a vehicle; the vehicle sensor 40 that detects a state of the vehicle; the camera 12, the radar device 14, and the finder 16 that are used to recognize a peripheral situation of the vehicle; the storage 180 that stores the control logic LG; the action plan generator 140 (an example of a deriver) that generates a target trajectory in which a state indicating a behavior of the vehicle in the future is included as an element based on at least external information of vehicle state information and the external information (preferably, based on both pieces of the information) by executing the deactivated control logic LG; the determinator 174 that compares an operation amount for each operator detected by the operation detection sensor 80a under manual driving with an operation amount for each operator derived when each element (a speed, a position, or the like) included in the target trajectory is used as a control amount to determine whether or not a behavior (an example of a first behavior) of the own vehicle M under the manual driving matches a behavior (an example of a second behavior) of the own vehicle M assumed under virtual automated driving, and thus determines whether or not the control logic LG is accurately operated; and the output controller 176 that transmits collected data (an example of output information) including at least the vehicle state information and the external information to the server apparatus 300 via the communication device 20 in a case where the determinator 174 determines that the control logic LG is not accurately operated (for example, the behavior of the own vehicle M under the manual driving does not match the behavior of the own vehicle M assumed under the virtual automated driving), and thus a developer can verify the control logic LG in detail.

According to the above-described first embodiment, in a case where the behavior of the own vehicle M under the manual driving does not match the behavior of the own vehicle M assumed under the virtual automated driving, the collected data is not transmitted to the server apparatus 300, and thus it is possible to reduce an amount of communication data.

According to the above-described first embodiment, since the external information, the vehicle state information, and the user operation information are collected from the vehicle control system 10 mounted in a popular vehicle or the like, it is possible to reduce the time required to collect data or to exhaustively (widely) data in terms of a plurality of traveling routes or a plurality of users more than in a case of collecting data from only a test vehicle.

According to the above-described first embodiment, the vehicle control system 10 can verify the accuracy of the control logic LG by using raw data including at least the external information among the user operation information indicating a user's operation amount for each operator, the target trajectory information indicating an operation amount for each operator derived when each element (a speed, a position, or the like) included in a target trajectory is used as a control amount, the vehicle state information, and the external information.

According to the above-described first embodiment, since the control logic is deactivated, it is possible to collect the external information, the vehicle state information, and the user operation information without making the occupant particularly aware of the deactivation under manual driving.

According to the above-described first embodiment, since the collected data is transmitted to the server apparatus 300 in a case where a behavior of the own vehicle M under manual driving does not match a behavior of the own vehicle M assumed under virtual automated driving, that is, an operation amount for the driving operator 80 under the manual driving deviates from an operation amount for each operator assumed under the virtual automated driving, when a driving operation of the occupant is correct, the operation amount for the driving operator 80 under the manual driving is correlated as a training label (correct answer data) with the vehicle state information and the external information included in the collected data. Therefore, it is possible to omit work that the developer assigns the training label while sequentially checking the collected data.

Second Embodiment

Hereinafter, a second embodiment will be described. In the above-described first embodiment, a description will be made of a case where the activation controller 178 activates the control logic LG when it is determined by the determinator 174 that the control logic LG is accurately operated since a behavior of the own vehicle M when an occupant performs manual driving matches a behavior of the own vehicle M in a case of assuming automated driving. In contrast, the second embodiment is different from the above-described first embodiment in that the activation controller 178 activates the control logic LG even when it is determined by the determinator 174 that the control logic LG is not accurately operated. Hereinafter, a description will focus on differences from the first embodiment, and descriptions of functions common to those in the first embodiment will not be repeated.

In the second embodiment, in a case where it is determined that the control logic LG is not accurately operated, the determinator 174 further determines whether or not a manual driving operation of the occupant is a predetermined driving operation based on a peripheral situation of the own vehicle M recognized by the recognizer 130. The predetermined driving operation is, for example, driving such as inattentive driving or dozing driving that the occupant neglects to monitor the periphery of the own vehicle M.

For example, in a case where time to collision (TTC) between a preceding vehicle recognized by the recognizer 130 and the own vehicle M is less than a threshold value, the determinator 174 may determine that the manual driving operation of the occupant is the predetermined driving operation. In a case where the own vehicle M is separated from the own lane center recognized by the recognizer 130 by a predetermined distance or more, the determinator 174 may determine that the manual driving operation of the occupant is the predetermined driving operation.

In the second embodiment, the activation controller 178 activates the control logic LG even when it is determined that the control logic LG is not accurately operated in a case where it is determined by the determinator 174 that the manual driving operation of the occupant is the predetermined driving operation. Consequently, the second controller 160 automatedly drives the own vehicle M instead of the occupant who is highly possibly performing inattentive driving or dozing driving.

In the second embodiment, the determinator 174 may count the number of times (hereinafter, referred to as a third mismatching number of times) in which a behavior (an example of a third behavior) of the own vehicle M when the occupant performs the predetermined driving operation does not match a behavior of the own vehicle M under virtual automated driving until the own vehicle M travels a predetermined distance or until a predetermined time elapses by taking into consideration a probability that the occupant may perform the predetermined driving operation, count the number of times (hereinafter, referred to as a third matching number of times) in which the behaviors match each other, determine that the control logic LG is accurately operated in a case where a ratio obtained by dividing the third mismatching number of times by a total number of times (a sum of the third mismatching number of times and the third matching number of times) is equal to or higher than a predetermined ratio, and determine that the control logic LG is not accurately operated in a case where the ratio obtained by dividing the third mismatching number of times by the total number of times lower than the predetermined ratio. The third mismatching number of times is an example of a "third number of times", and the third matching number of times is an example of a "fourth number of times".

In the second embodiment, the activation controller 178 activates the control logic LG when it is determined by the determinator 174 that the control logic LG is not accurately operated. Consequently, since target trajectory information is output to the second controller 160 from the action plan generator 140, the second controller 160 performs automated driving by controlling steering and a speed of the own vehicle M based on a target trajectory indicated by the target trajectory information.

According to the above-described second embodiment, even when it is determined that a behavior of the own vehicle M in a case where an occupant performs manual driving does not match a behavior of the own vehicle M in a case of assuming automated driving, the own vehicle M is automatedly driven, and thus it is possible to further increase the safety of the occupant.

Third Embodiment

Hereinafter, a third embodiment will be described. In the above-described first embodiment or second embodiment, a description has been made of a case where a behavior of the own vehicle M under manual driving is compared with a behavior of the own vehicle M under virtual automated driving. In contrast, the third embodiment is different from the first embodiment and the second embodiment in that the control logic LG with a new version in terms of the update date and time and the control logic LG with an old version in terms of the update date and time are stored in the storage 180, a behavior of the own vehicle M under actual automated driving based on the control logic LG with the old version is compared with a behavior of the own vehicle M under virtual automated driving based on the control logic LG with the new version while the own vehicle M is being automatedly driven based on the control logic LG with the old version. Hereinafter, a description will focus on differences from the first embodiment and the second embodiment, and descriptions of functions common to those in the first embodiment and the second embodiment will not be repeated.

Figure 9:
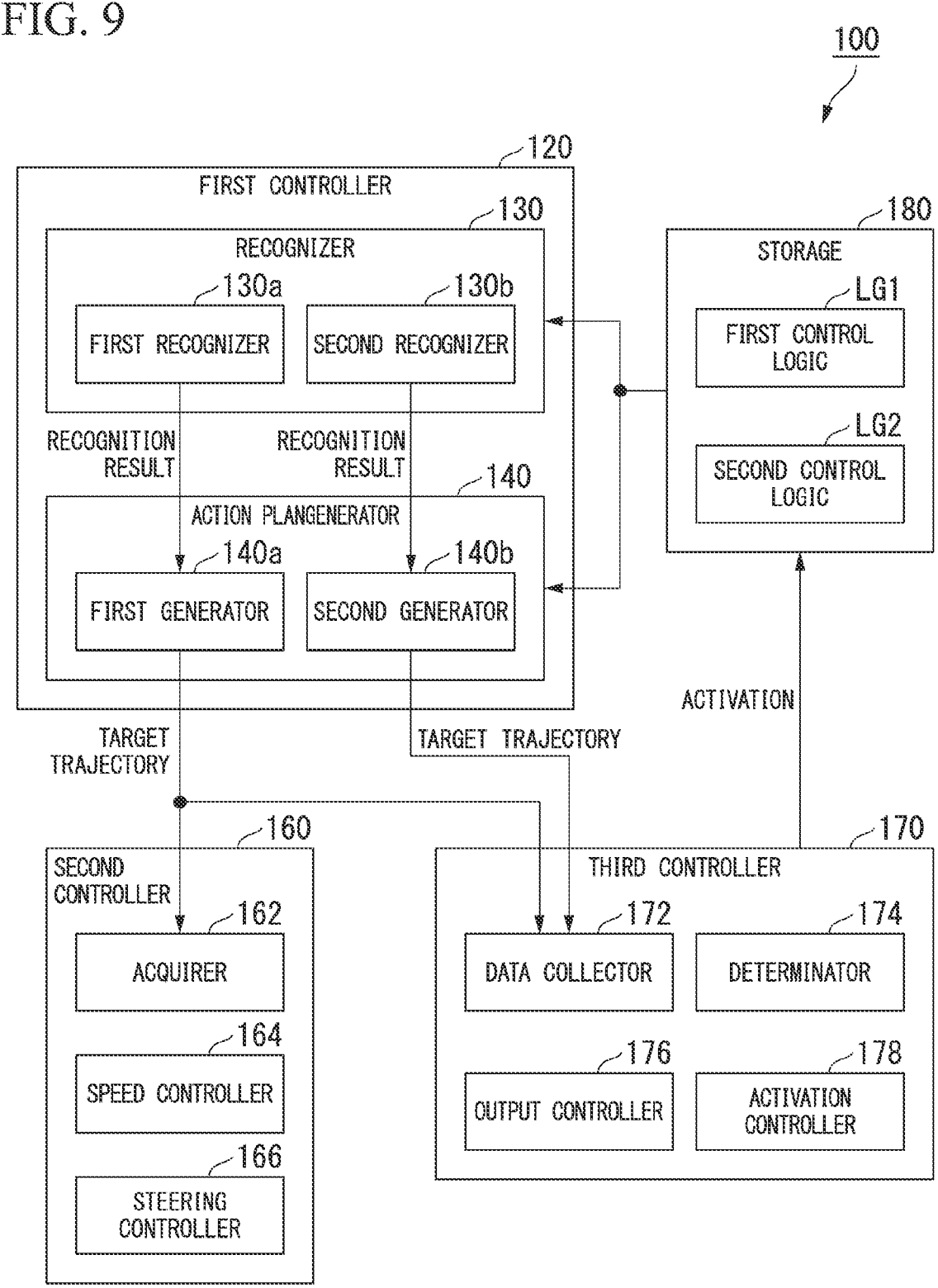
FIG. 9 is a diagram illustrating a functional configuration of a first controller 120, a second controller 160, and a third controller 170 in a third embodiment.

FIG. 9 is a diagram illustrating configurations of the first controller 120, the second controller 160, and the third controller 170 in the third embodiment.

A first control logic LG1 and a second control logic LG2 are stored in the storage 180 in the third embodiment. The first control logic LG1 is the control logic LG with an old version in terms of the update date and time, and may be, for example, a data structure or a program for executing advanced driver-assistance systems (ADAS) assisting with a driver's driving. The second control logic LG2 is the control logic LG with the latest version in terms of the update date and time, and may be, for example, a data structure or a program for performing automated driving.

Each of the first control logic LG1 and the second control logic LG2 may include dictionary data, a first logic, and a second logic. In the present embodiment, it is assumed that, of the first control logic LG1 and the second control logic LG2, the first control logic LG1 is activated, and the second control logic LG2 is deactivated.

In the third embodiment, the recognizer 130 includes, for example, a first recognizer 130a and a second recognizer 130b.

The first recognizer 130a recognizes an own lane, an adjacent lane, a lane boundary, or the like by referring to the dictionary data of the first control logic LG1 stored in the storage 180, or recognizes a state of an object present in the periphery of the own vehicle M based on external information.

The second recognizer 130b recognizes an own lane, an adjacent lane, a lane boundary, or the like by referring to the dictionary data of the second control logic LG2 stored in the storage 180, or recognizes a state of an object present in the periphery of the own vehicle M based on external information.

In the third embodiment, the action plan generator 140 includes, for example, a first generator 140a and a second generator 140b.

The first generator 140a generates a target trajectory (hereinafter, referred to as a first target trajectory) based on the first control logic LG1 stored in the storage 180. For example, the first generator 140a inputs sensor detection results from the camera 12, the radar device 14, the finder 16, and the like or a recognition result from the recognizer 130 and vehicle state information that is a detection result from the vehicle sensor 40 to the first logic included in the first control logic LG1 to determine an event of automated driving, and inputs information indicating the determined event to the second logic included in the first control logic LG1 to generate the first target trajectory. Since the first control logic LG1 is activated, the first generator 140a outputs target trajectory information indicating the first target trajectory that is generated based on the first control logic LG1 to the second controller 160 and the third controller 170.

The second generator 140b generates a target trajectory (hereinafter, referred to as a second target trajectory) based on the second control logic LG2 stored in the storage 180. For example, the second generator 140b inputs sensor detection results from the camera 12, the radar device 14, the finder 16, and the like or a recognition result from the recognizer 130 and vehicle state information that is a detection result from the vehicle sensor 40 to the first logic included in the second control logic LG2 to determine an event of automated driving, and inputs information indicating the determined event to the second logic included in the second control logic LG2 to generate the second target trajectory. Since the second control logic LG2 is deactivated, the second generator 140b outputs target trajectory information indicating the second target trajectory that is generated based on the second control logic LG2 to the third controller 170.

In the third embodiment, the second controller 160 controls the traveling drive force output device 200, the brake device 210, and the steering device 220 such that the own vehicle M can pass along the target trajectory generated by the first generator 140a as scheduled.

In the third embodiment, the data collector 172 repeatedly, in a predetermined cycle, collects external information from the object recognition device 18, or the camera 12, the radar device 14, and the finder 16, collects vehicle state information from the vehicle sensor 40, or collects user operation information from each operation detection sensor 80a of the driving operator 80. The data collector 172 acquires the target trajectory information from each of the first generator 140a and the second generator 140b.

In the third embodiment, the determinator 174 compares the pieces of target trajectory information collected by the data collector 172 from the first generator 140a and the second generator 140b with each other, and determines whether or not the second control logic LG2 stored in the storage 180 of the own vehicle M is accurately operated.

For example, in a case where a behavior of the own vehicle M when following the first target trajectory matches a behavior of the own vehicle M when following the second target trajectory, that is, a behavior of the own vehicle M under automated driving based on the first control logic LG1 matches a behavior of the own vehicle M under virtual automated driving based on the second control logic LG2, the determinator 174 determines that the second control logic LG2 is accurately operated assuming that the first control logic LG1 is correct.

On the other hand, in a case where the behavior of the own vehicle M when following the first target trajectory does not match the behavior of the own vehicle M when following the second target trajectory, that is, the behavior of the own vehicle M under automated driving based on the first control logic LG1 does not match the behavior of the own vehicle M under virtual automated driving based on the second control logic LG2, the determinator 174 determines that the second control logic LG2 is not accurately operated assuming that the first control logic LG1 is correct.

In the same manner as in the first embodiment, in the third embodiment, the determinator 174 may count the number of times in which a behavior of the own vehicle M when following the first target trajectory matches a behavior of the own vehicle M when following the second target trajectory until the own vehicle M travels a predetermined distance or until a predetermined time elapses, and determine whether or not the second control logic LG2 is accurately operated based on a ratio obtained by dividing the counted matching number of times by a total number of times including a mismatching number of times.

Instead of determining whether or not the second control logic LG2 is accurately operated assuming that the first control logic LG1 is corrected, the determinator 174 may determine whether or not the first control logic LG1 is accurately operated assuming that the second control logic LG2 is correct.

In the third embodiment, for example, in a case where it is determined by the determinator 174 that the second control logic LG2 is not accurately operated assuming that the first control logic LG1 is corrected, the output controller 176 controls the communication device 20 to transmit the collected data to the server apparatus 300. In a case where it is determined by the determinator 174 that the first control logic LG1 is not accurately operated assuming that the second control logic LG2 is corrected, the output controller 176 may control the communication device 20 to transmit the collected data to the server apparatus 300.

In the third embodiment, at least the second control logic LG2 of the first control logic LG1 and the second control logic LG2 is stored in the server-side storage 330 of the server apparatus 300.

In the third embodiment, when the collected data is received from the vehicle control system 10 by the server-side communicator 302, the information provider 312 provides a screen for inquiring whether or not the collected data is used as training data for the control logic LG to a terminal apparatus of a developer via a website or the like.

The developer checks the collected data provided to the terminal apparatus, and determines whether or not the second control logic LG2 is correctly operated based on a peripheral situation of the vehicle when the data is collected. In a case where it is checked that the second control logic LG2 is correctly operated, the developer determines that the assumption that the first control logic LG1 is correct is wrong, and transmits information indicating that the second control logic LG2 is correctly operated to the server apparatus 300 by using the terminal apparatus. In a case where it is checked that the second control logic LG2 is not correctly operated, the developer transmits information indicating that the second control logic LG2 is not correctly operated to the server apparatus 300 by using the terminal apparatus.

In the third embodiment, in a case where the information indicating that the second control logic LG2 is correctly operated is received from the terminal apparatus of the developer by the server-side communicator 302, the logic updater 314 controls the server-side communicator 302 to transmit activation feasibility information indicating that activation of the second control logic LG2 is permitted and activation of the first control logic LG1 is prohibited, to the vehicle control system 10 of each vehicle. Consequently, the control logic LG to be activated is switched from the first control logic LG1 to the second control logic LG2 with a better version than that of the first control logic LG1.

In a case where the information indicating that the second control logic LG2 is not correctly operated is received from the terminal apparatus of the developer by the server-side communicator 302, the logic updater 314 learns the second control logic LG2 through supervised learning based on the collected data that is collected, and thus updates the second control logic LG2.

For example, the logic updater 314 generates training data based on collected data that is collected when the second control logic LG2 is not accurately operated assuming that the first control logic LG1 is correct, and learns the second control logic LG2 based on the training data to generate the control logic LG (hereinafter, referred to as a third control logic LG3) with a new version to which the second control logic LG2 is updated.

When the third control logic LG3 is generated, the logic updater 314 controls the server-side communicator 302 to transmit the third control logic LG3 and activation feasibility information indicating that activation of the third control logic LG3 is prohibited, to the vehicle control system 10 of each vehicle.

In the third embodiment, in a case where the activation feasibility information indicating that activation of the second control logic LG2 is permitted and activation of the first control logic LG1 is prohibited is received from the server apparatus 300 via the communication device 20, the activation controller 178 activates the second control logic LG2 stored in the storage 180 and deactivates the first control logic LG1. Consequently, the second controller 160 can control steering and a speed of the own vehicle M based on the second target trajectory, so that the own vehicle M is automatedly driven based on the second control logic LG2.

In a case where the third control logic LG3 and the activation feasibility information indicating that activation of the third control logic LG3 is prohibited are received from the server apparatus 300 via the communication device 20, the activation controller 178 writes the third control logic LG3 into the storage 180 and deactivates the third control logic LG3. In this case, the first recognizer 130a and the first generator 140a perform the above-described processes based on the first control logic LG1, and the second recognizer 130b and the second generator 140b perform the above-described processes based on the third control logic LG3. As a result, it is determined whether or not the third control logic LG3 is accurately operated assuming that the first control logic LG1 is correct, and, in a case where it is determined that the third control logic LG3 is not accurately operated, the collected data is transmitted to the server apparatus 300.

In the above-described third embodiment, the first controller 120 may execute the second control logic LG2 in accordance with a process load when the first control logic LG1 is executed. For example, the second recognizer 130b and the second generator 140b may monitor a usage rate of a processor realizing the first controller 120 when the first control logic LG1 is executed by the first recognizer 130a and the first generator 140a, may not execute the second control logic LG2 in a case where the usage rate of the processor is equal to or more than a threshold value, and may execute the second control logic LG2 in a case where the usage rate of the processor is less than the threshold value. Consequently, it is possible to secure a resource for processes required to perform automated driving.

In the above-described third embodiment, a description has been made of a case where, when the information indicating that the second control logic LG2 is not correctly operated is received from the terminal apparatus of the developer by the server-side communicator 302, the logic updater 314 learns the second control logic LG2 based on the training data to generate the third control logic LG3 with a new version to which the second control logic LG2 is updated, but the present invention is not limited thereto. For example, in a case where the information indicating that the second control logic LG2 is not correctly operated is received from the terminal apparatus of the developer by the server-side communicator 302, the logic updater 314 may replace the existing second control logic LG2 with another control logic LG by using another control logic LG that is generated along with the second control logic LG2 as the third control logic LG3 instead of generating the third control logic LG3 from the existing second control logic LG2.

In the above-described third embodiment, a description has been made of a case where a behavior (real behavior) of the vehicle when the own vehicle M is automatedly driven based on a target trajectory obtained by executing the first control logic LG1 is compared with a behavior (virtual behavior) of the vehicle when the own vehicle M is virtually automatedly driven based on a target trajectory obtained by executing the second control logic LG2, but the present invention is not limited thereto. For example, a virtual behavior of the own vehicle M based on the first control logic LG1 may be compared with a virtual behavior of the own vehicle M based on the second control logic LG2 without generating a real behavior with the first control logic LG1.

According to the above-described third embodiment, since, among a plurality of control logics that are different in the update date and time, a behavior of the own vehicle M based on the first target trajectory generated by executing the first control logic LG1 with a certain update date and time is compared with a behavior of the own vehicle M based on the second target trajectory generated by executing the second control logic LG2 with an update date and time later than that of the first control logic LG1, and it is determined whether or not the second control logic LG2 is accurately operated assuming that the first control logic LG1 is correct, the second control logic LG2 can be verified even though the control logic LG to be activated is not changed from the first control logic LG1 of which the reliability is already ensured to some degree to the second control logic LG2 with the later update date and time.

According to the above-described third embodiment, in a case where it is determined that the second control logic LG2 is not accurately operated assuming that the first control logic LG1 is correct, the collected data is transmitted to the server apparatus 300, and thus the developer can check the collected data transmitted to the server apparatus 300 to check whether or not the second control logic LG2 is accurately operated. In a case where the developer checks that the second control logic LG2 is accurately operated, the developer can consider that the assumption that the first control logic LG1 is correct is wrong, and the accuracy the second control logic LG2 is higher than that of the first control logic LG1. Therefore, the server apparatus 300 transmits activation feasibility information for deactivating the first control logic LG1 and activating the second control logic LG2 to each vehicle having the vehicle control system 10 mounted therein. Consequently, it is possible to perform automated driving that can more flexibly cope with a peripheral situation of the own vehicle M.

Hardware Configuration

Figure 10:
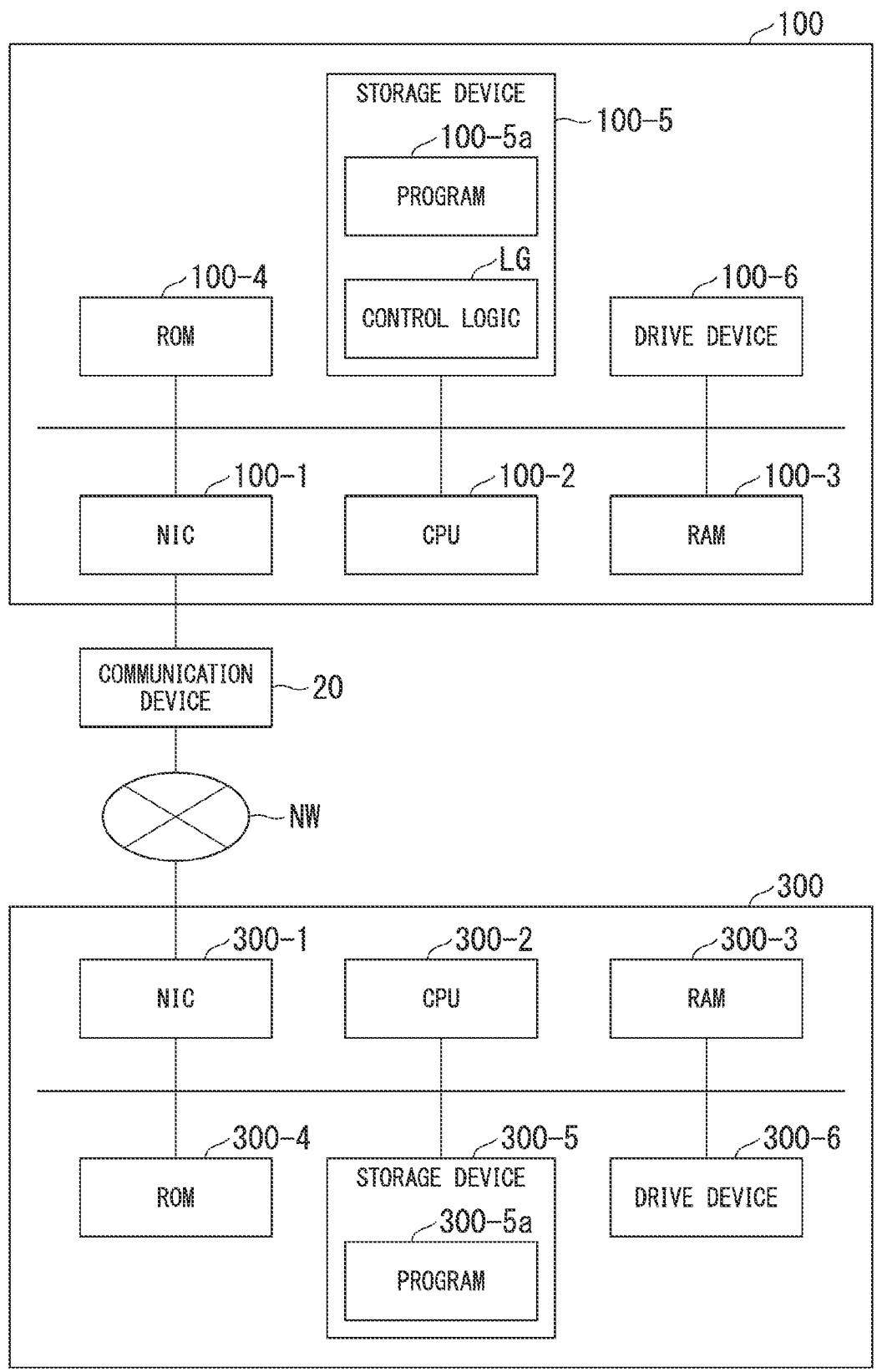
FIG. 10 is a diagram illustrating examples of hardware configurations of an automated driving control device and a server apparatus according to an embodiment.

FIG. 10 is a diagram illustrating examples of hardware configurations of the automated driving control device 100 and the server apparatus 300 according to the embodiment.

As illustrated in FIG. 10, the automated driving control device 100 is configured to include a communication controller 100-1, a CPU 100-2, a RAM 100-3 used as a working memory, a ROM 100-4 storing a boot program or the like, a storage device 100-5 such as a flash memory or an HDD, and a drive device 100-6 that are connected to each other via an internal bus or a dedicated communication line. The communication controller 100-1 performs communication with constituents other than the automated driving control device 100. The storage device 100-5 stores a program 100-5a executed by the CPU 100-2 and the control logic LG. The program 100-5a is loaded to the RAM 100-3 by a direct memory access (DMA) controller (not illustrated), and is executed by the CPU 100-2. Consequently, some or all of the first controller 120, the second controller 160, and the third controller 170 are realized.

The server apparatus 300 is configured to include a communication controller 300-1, a CPU 300-2, a RAM 300-3 used as a working memory, a ROM 300-4 storing a boot program or the like, a storage device 300-5 such as a flash memory or an HDD, and a drive device 300-6 that are connected to each other via an internal bus or a dedicated communication line. The communication controller 300-1 performs communication with the automated driving control device 100 and the like. The storage device 300-5 stores a program 300-5a executed by the CPU 300-2. The program 300-5a is loaded to the RAM 300-3 by a DMA controller (not illustrated) and the like, and is executed by the CPU 300-2. Consequently, the server-side controller 310 is realized.

The embodiments may be expressed as follows.
A vehicle control device includes
a first detector configured to detect a behavior of a vehicle,
a second detector configured to detect a peripheral situation of the vehicle,
a storage configured to store a first program that is learned to output information indicating a behavior of the vehicle when at least information indicating a peripheral situation of the vehicle is input to the first program, and a certain second program, and
a processor,
in which the processor executes the first program, and thus
derives a behavior of the vehicle based on at least the peripheral situation detected by the second detector, and
executes the second program to compare a first behavior of the vehicle detected by the first detector at a certain reference time with a second behavior of the vehicle derived by executing the first program based on the peripheral situation detected by the second detector at the reference time and to determine whether or not the first program is accurately operated.

As mentioned above, the mode for carrying out the present invention has been described by using the embodiment, but the present invention is not limited to the embodiment, and various modifications and replacements may occur within the scope without departing from the spirit of the present invention.

REFERENCE SIGNS LIST

1 Automated driving vehicle development system
10 Vehicle control system
12 Camera
14 Radar device
16 Finder
18 Object recognition device
20 Communication device
30 HMI
40 Vehicle sensor
50 Navigation device
60 MPU
80 Driving operator
100 Automated driving control device
120 First controller
130 Recognizer
140 Action plan generator
160 Second controller
162 Acquirer
164 Speed controller
166 Steering controller
170 Third controller
172 Data collector
174 Determinator
176 Output controller
178 Activation controller
180 Storage
200 Traveling drive force output device
210 Brake device
220 Steering device
300 Server apparatus
302 Server-side communicator
310 Server-side controller
312 Information provider
314 Logic updater

What is claim is:

1. A vehicle control device comprising:
a first sensor configured to detect a first behavior of a vehicle, wherein the first behavior represents manual operation of the vehicle;
a second sensor configured to detect a peripheral situation of the vehicle;
a hardware processor executing software, hardware including circuitry, or a cooperation of the software and the hardware configured to operate as:
a storage configured to store a control logic that outputs information indicating a behavior of the vehicle when at least information indicating a peripheral situation of the vehicle is input to the control logic;
a deriver configured to execute the control logic to derive a second behavior of the vehicle based on at least the peripheral situation of the vehicle detected by the second sensor, wherein the second behavior represents target automated control of the vehicle;
a determinator configured to compare the first behavior of the vehicle detected by the first sensor at a certain reference time with the second behavior of the vehicle derived by the deriver based on the peripheral situation detected by the second sensor at the certain reference time to determine whether or not the control logic is accurately operated, in a case where the control logic is updated by update information received from an external apparatus of the vehicle; and
a driving controller configured to cause the vehicle to travel based on the target automated control of the vehicle and based on switching from the manual operation of the vehicle to automatic control of the vehicle,
wherein the determinator
determines that the control logic is accurately operated in a case where a difference between first operation amounts of the first behavior and second operation amounts of the second behavior are determined to be within a predetermined error range, and
determines that the control logic is not accurately operated in a case where the difference between the first operation amounts of the first behavior and the second operation amounts of the second behavior are determined to be outside the predetermined error range,
wherein the vehicle control device further comprises:
a communication device configured to output information; and
an output controller configured to output, from the communication device, output information including at least information indicating the peripheral situation of the vehicle detected by the second sensor in a case where the determinator determines that the difference between the first operation amounts of the first behavior and the second operation amounts of the second behavior are determined to be outside the predetermined error range,
wherein the determinator
determines whether or not a third behavior of the vehicle detected by the first sensor when an occupant performs a predetermined driving operation matches the second behavior in a period until the vehicle travels a predetermined distance or until a predetermined time elapses, and
determines that the control logic is accurately operated in a case where a ratio obtained by dividing a third number of times in which third operation amounts of the third behavior and the second operation amounts of the second behavior are determined to be outside the predetermined error range in the period by a sum of a fourth number of times in which the third operation amounts of the third behavior and the second operation amounts of the second behavior are determined to be within the predetermined error range in the period and the third number of times is equal to or higher than a predetermined ratio.

2. The vehicle control device according to claim 1, wherein the determinator
determines whether or not a difference between the first operation amounts of the first behavior and second operation amounts of the second behavior are determined to be within the predetermined error range in a period until the vehicle travels the predetermined distance or until the predetermined time elapses, and
determines that the control logic is accurately operated in a case where a ratio obtained by dividing a first number of times in which the difference between the first operation amounts of the first behavior and the second operation amounts of the second behavior are determined to be within the predetermined error range in the period by a sum of a second number of times in which the difference between the first operation amounts of the first behavior and the second operation amounts of the second behavior are determined to be outside the predetermined error range in the period and the first number of times is equal to or higher than the predetermined ratio.

3. The vehicle control device according to claim 1, wherein the control logic is learned based on training data in which the output information is correlated with identification information indicating a behavior of the vehicle to be output as a training label.

4. The vehicle control device according to claim 1, wherein, in a case where the determinator determines that the difference between the first operation amounts of the first behavior and the second operation amounts of the second behavior are determined to be outside the predetermined error range, the output controller
outputs the output information from the communication device to the storage to store the output information into the storage, or
outputs the output information from the communication device to the external apparatus.

5. The vehicle control device according to claim 1, wherein the driving controller causes the vehicle to travel by controlling a speed and steering of the vehicle based on the second behavior in a case where the determinator determines that the control logic is not accurately operated, and a predetermined driving operation is satisfied, wherein the predetermined driving operation is one of inattentive driving or dozing driving.

6. The vehicle control device according to claim 1, wherein, in a case where the control logic is not accurately operated, the determinator further determines whether or not a driving operation of the occupant of the vehicle is a predetermined driving operation based on the peripheral situation of the vehicle detected by the second sensor, and
wherein the driving controller causes the vehicle to travel by controlling a speed and steering of the vehicle based on the second behavior in a case where the determinator determines that the driving operation of the occupant of the vehicle is the predetermined driving operation.

7. The vehicle control device according to claim 1, wherein the hardware processor executing software, the hardware including the circuitry, or the cooperation of the software and the hardware are further configured to operate as:
a first communication device configured to receive predetermined information regarding the control logic from the external apparatus that is an output destination of the output information, and
the driving controller causes the vehicle to travel by controlling a speed and steering of the vehicle based on the second behavior in a case where the predetermined information is received by the first communication device.

8. An automated driving vehicle development system comprising:
a plurality of vehicles configured to have the vehicle control device according to claim 1 mounted thereon; and
a server apparatus including
a second communication device configured to perform communication with each of the plurality of vehicles to acquire first information indicating the first behavior and second information indicating the second behavior, and
a determiner configured to compare a set of the first behaviors indicated by a plurality of pieces of the first information acquired by the second communication device with a set of the second behaviors indicated by a plurality of pieces of the second information and to determine whether or not to permit automated driving in which the vehicle control device mounted on each of the plurality of vehicles causes the vehicle to travel by controlling a speed and steering of the vehicle based on the second behavior.

9. The automated driving vehicle development system according to claim 8,
wherein the determiner
counts the number of combinations in which a difference between the first operation amounts of the first behavior and second operation amounts of the second behavior are determined to be within the predetermined error range in the set of the first behaviors and the set of the second behaviors, and
permits the vehicle control device to perform the automated driving in a case where a ratio obtained by dividing the counted number by the number of all combinations of the first behaviors and the second behaviors is equal to or higher than the predetermined ratio.

10. The automated driving vehicle development system according to claim 8,
wherein, in a case where the vehicle control device is permitted to perform the automated driving, the determiner controls the second communication device to transmit predetermined information for permitting the automated driving based on the second behavior that is derived by executing the control logic, to each of the plurality of vehicles.

11. A vehicle control device comprising:
a first sensor configured to detect a first behavior of a vehicle, wherein the first behavior represents manual operation of the vehicle;
a second sensor configured to detect a peripheral situation of the vehicle;
a hardware processor executing software, hardware including circuitry, or a cooperation of the software and the hardware configured to operate as:
a storage configured to store a plurality of control logics that output information indicating a behavior of the vehicle when at least information indicating a peripheral situation of the vehicle is input to the plurality of control logics;
a deriver configured to execute the plurality of control logics to derive a second behavior of the vehicle based on at least the peripheral situation of the vehicle detected by the second sensor, wherein the second behavior represents target automated control of the vehicle;
a determinator configured to, in a case where a second control logic different from a first control logic that is stored in the storage from the beginning is received from an external apparatus of the vehicle and is additionally stored in the storage, compare the first behavior of the vehicle derived by the deriver having executed the first control logic with the second behavior of the vehicle derived by the deriver having executed the second control logic of which the update date and time is later than the update date and time of the first control logic to determine whether or not the second control logic is accurately operated; and a driving controller configured to cause the vehicle to travel based on the target automated control of the vehicle and based on switching from the manual operation of the vehicle to automatic control of the vehicle wherein the determinator determines that the plurality of control logics is accurately operated in a case where a difference between first operation amounts of the first behavior and second operation amounts of the second behavior are determined to be within a predetermined error range, and determines that the plurality of control logics is not accurately operated in a case where the difference between the first operation amounts of the first behavior and the second operation amounts of the second behavior are determined to be outside the predetermined error range, wherein the vehicle control device further comprises:

a communication device configured to output information; and an output controller configured to output, from the communication device, output information including at least information indicating the peripheral situation of the vehicle detected by the second sensor in a case where the determinator determines that the difference between the first operation amounts of the first behavior and the second operation amounts of the second behavior are determined to be outside the predetermined error range, wherein the determinator determines whether or not a third behavior of the vehicle detected by the first sensor when an occupant performs a predetermined driving operation matches the second behavior in a period until the vehicle travels a predetermined distance or until a predetermined time elapses, and determines that the plurality of control logics is accurately operated in a case where a ratio obtained by dividing a third number of times in which third operation amounts of the third behavior and the second operation amounts of the second behavior are determined to be outside the predetermined error range in the period by a sum of a fourth number of times in which the third operation amounts of the third behavior and the second operation amounts of the second behavior are determined to be within the predetermined error range in the period and the third number of times is equal to or higher than a predetermined ratio.

12. The vehicle control device according to claim 11, wherein the driving controller causes the vehicle to travel by controlling a speed and steering of the vehicle based on the second behavior of the vehicle derived by the deriver having executed the second control logic.

13. The vehicle control device according to claim 11, wherein the deriver derives the second behavior by executing the second control logic in accordance with a process load when the first behavior is derived by executing the first control logic.

14. A vehicle control method of causing an in-vehicle computer including a processor, a first sensor configured to detect a first behavior of a vehicle, wherein the first behavior represents manual operation of the vehicle, a second sensor configured to detect a peripheral situation of the vehicle, and a storage configured to store a control logic that outputs information indicating a behavior of the vehicle when at least information indicating a peripheral situation of the vehicle is input to the control logic to cause the processor to:

execute the control logic to derive a second behavior of the vehicle based on at least the peripheral situation of the vehicle detected by the second sensor, wherein the second behavior represents target automated control of the vehicle;

compare, in a case where the control logic is updated by update information received from an external apparatus of the vehicle, the first behavior of the vehicle detected by the first sensor at a certain reference time with the second behavior of the vehicle derived by the updated control logic based on the peripheral situation detected by the second sensor at the certain reference time to determine whether or not the control logic is accurately operated; and based on changing from the manual operation of the vehicle to automatic control of the vehicle, causing the vehicle to travel based on the target automated control of the vehicle, wherein the control logic is further configured to cause the processor to:

determine that the control logic is accurately operated in a case where a difference between first operation amounts of the first behavior and second operation amounts of the second behavior are determined to be within a predetermined error range, and determine that the control logic is not accurately operated in a case where the difference between the first operation amounts of the first behavior and the second operation amounts of the second behavior are determined to be outside the predetermined error range, wherein the control logic is further configured to cause the processor to:

output information including at least information indicating the peripheral situation of the vehicle detected by the second sensor in a case where it is determined that the difference between the first operation amounts of the first behavior and the second operation amounts of the second behavior are determined to be outside the predetermined error range, determine whether or not a third behavior of the vehicle detected by the first sensor when an occupant performs a predetermined driving operation matches the second behavior in a period until the vehicle travels a predetermined distance or until a predetermined time elapses, and determine that the control logic is accurately operated in a case where a ratio obtained by dividing a third number of times in which third operation amounts of the third behavior and the second operation amounts of the second behavior are determined to be outside the predetermined error range in the period by a sum of a fourth number of times in which the third operation amounts of the third behavior and the second operation amounts of the second behavior are determined to be within the predetermined error range in the period and the third number of times is equal to or higher than a predetermined ratio.

15. A non-transitory computer readable recording medium storing program causing an in-vehicle computer including a processor, a first sensor configured to detect a first behavior of a vehicle, wherein the first behavior represents manual operation of the vehicle, a second sensor configured to detect a peripheral situation of the vehicle, and a storage configured to store a control logic that outputs information indicating a behavior of the vehicle when at least information indicating a peripheral situation of the vehicle is input to the control logic, to cause the processor to execute:
- a process of executing the control logic to derive a second behavior of the vehicle based on at least the peripheral situation of the vehicle detected by the second sensor, wherein the second behavior represents target automated control of the vehicle;
- a process of comparing, in a case where the control logic is updated by update information received from an external apparatus of the vehicle, the first behavior of the vehicle detected by the first sensor at a certain reference time with the second behavior of the vehicle derived by the updated control logic based on the peripheral situation detected by the second sensor at the certain reference time to determine whether or not the control logic is accurately operated; and
- based on changing from the manual operation of the vehicle to automatic control of the vehicle, causing the vehicle to travel based on the target automated control of the vehicle, wherein the process of comparing comprises:
  - determining that the control logic is accurately operated in a case where a difference between first operation amounts of the first behavior and second operation amounts of the second behavior are determined to be within a predetermined error range, and
  - determining that the control logic is not accurately operated in a case where the difference between the first operation amounts of the first behavior and the second operation amounts of the second behavior are determined to be outside the predetermined error range, wherein the control logic is further configured to cause the processor to:
- output information including at least information indicating the peripheral situation of the vehicle detected by the second sensor in a case where it is determined that the difference between the first operation amounts of the first behavior and the second operation amounts of the second behavior are determined to be outside the predetermined error range, wherein the process of comparing further comprises:
- determining whether or not a third behavior of the vehicle detected by the first sensor when an occupant performs a predetermined driving operation matches the second behavior in a period until the vehicle travels a predetermined distance or until a predetermined time elapses, and
- determining that the control logic is accurately operated in a case where a ratio obtained by dividing a third number of times in which third operation amounts of the third behavior and the second operation amounts of the second behavior are determined to be outside the predetermined error range in the period by a sum of a fourth number of times in which the third operation amounts of the third behavior and the second operation amounts of the second behavior are determined to be within the predetermined error range in the period and the third number of times is equal to or higher than a predetermined ratio.

* * * * *